(12) United States Patent
Nishizawa

(10) Patent No.: US 9,465,452 B2
(45) Date of Patent: Oct. 11, 2016

(54) INFORMATION PROCESSING APPARATUS AND CONTROL METHOD OF INFORMATION PROCESSING APPARATUS

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 14/555,923

(22) Filed: Nov. 28, 2014

(65) Prior Publication Data

US 2015/0169096 A1 Jun. 18, 2015

(30) Foreign Application Priority Data

Dec. 16, 2013 (JP) .................. 2013-259059

(51) Int. Cl.
| | |
|---|---|
| G06F 3/041 | (2006.01) |
| G06F 3/0346 | (2013.01) |
| G06F 3/01 | (2006.01) |
| G06F 3/0484 | (2013.01) |
| G06F 3/0488 | (2013.01) |
| G02B 27/01 | (2006.01) |

(52) U.S. Cl.
CPC ......... G06F 3/0346 (2013.01); G02B 27/0172 (2013.01); G06F 3/017 (2013.01); G06F 3/04845 (2013.01); G06F 3/04883 (2013.01); G02B 2027/014 (2013.01); G02B 2027/0132 (2013.01); G02B 2027/0138 (2013.01); G02B 2027/0178 (2013.01); G06F 2203/04808 (2013.01)

(58) Field of Classification Search
CPC .. G06F 3/04865; G06F 3/0487; G06F 3/044; G06F 3/04875; G06F 3/045
USPC .......................................... 345/7–9, 173–179
See application file for complete search history.

(56) References Cited

U.S. PATENT DOCUMENTS

| | | | |
|---|---|---|---|
| 2005/0184972 A1* | 8/2005 | Tashiro | G06F 1/1626 345/173 |
| 2006/0066582 A1 | 3/2006 | Lyon et al. | |
| 2006/0066588 A1 | 3/2006 | Lyon et al. | |
| 2006/0209068 A1* | 9/2006 | Ajioka | A63F 13/10 345/427 |
| 2007/0257891 A1 | 11/2007 | Esenther et al. | |
| 2011/0044678 A1* | 2/2011 | Ogino | G02B 7/38 396/124 |

FOREIGN PATENT DOCUMENTS

| | | |
|---|---|---|
| JP | A-2007-299384 | 11/2007 |
| JP | A-2008-242881 | 10/2008 |
| JP | A-2009-523267 | 6/2009 |
| JP | A-2013-69350 | 4/2013 |

* cited by examiner

*Primary Examiner* — Kimnhung Nguyen
(74) *Attorney, Agent, or Firm* — Oliff PLC

(57) ABSTRACT

An information processing apparatus includes: an operation unit which includes an operation surface, and a position designation unit which detects at least one operation to the operation surface and outputs a position designation signal according to the detected position; and a control unit which performs a first control operation based on the position designation signal according to the first operation detected by the operation to the operation surface, continues the first operation, and performs a second control operation which is different from the first control operation with respect to the information processing apparatus, based on the new second operation to the operation surface.

14 Claims, 20 Drawing Sheets

TWO-POINT ROTATION
CONTROL OPERATION

INFORMATION PROCESSING APPARATUS AND CONTROL METHOD OF INFORMATION PROCESSING APPARATUS

BACKGROUND

1. Technical Field

The present invention relates to an information processing apparatus.

2. Related Art

A head mounted display (HMD) which is a display device to be mounted on the head has been known as one information processing apparatus. The head mounted display, for example, generates image light showing an image using a liquid crystal display and a light source, and introduces the generated image light to the eyes of a user using a projection optical system or a light guide plate, to allow a user to visually recognize a virtual image. As a control operation of the head mounted display, a control operation of detecting movement of a finger of a user touching a track pad included in an operation unit, and changing a virtual image to be visually recognized by a user or selecting a folder as a virtual image, to allow a user to visually recognize various files in a folder as a virtual image has been known.

JP-A-2007-299384 discloses an information processing apparatus which executes a click operation for performing selection by displaying a pointer corresponding to an intermediate position of two fingers touching an operation surface on an image display unit, changing a display position of the pointer according to the change of the intermediate position, and touching the operation surface with a third finger. JP-A-2008-242881 discloses an input device which changes a display position of a pointer displayed on an image display unit, depending on a change of a relative position relationship between a right forefinger and a left forefinger imaged by a camera. JP-T-2009-523267 discloses a system which displays a graphic object at a position that depends on a first location and a second location on a multi-touch sensitive screen, and moves the graphic object in the same manner as a mouse of a personal computer. JP-A-2013-69350 discloses a system which recognizes two fingers touching an operation surface as a click operation.

However, in the information processing apparatus disclosed in JP-A-2007-299384, since the pointer is displayed so as to correspond to the intermediate position of the two fingers touching the operation surface, it is necessary for a user to constantly recognize the intermediate position of the two fingers in order to move the pointer, and it is difficult to perform an intuitive operation. Since it is necessary to perform the operation with three fingers in order to perform the click operation, it is difficult to perform an intuitive operation, and the operation is redundant and complicated. In the input device disclosed in JP-A-2008-242881, since it is necessary to image the hand of a user with the camera, in order to receive an input operation, a size of the operation unit including the camera as the input device increases, and it is difficult to be employed as an operation unit of a mobile device that is portable by a user. In the systems disclosed in JP-T-2009-523267 and JP-A-2013-69350, when the click operation is received, all of the several fingers touching the operation surface are temporarily separated from the operation surface, and accordingly, if a touching position of the fingers on the operation surface after the click operation is different therefrom, the pointer may be moved to a position different from that desired by a user.

SUMMARY

An advantage of some aspects of the invention is to solve at least a part of the problems described above, and the invention can be implemented as the following aspects.

(1) An aspect of the invention provides an information processing apparatus. The information processing apparatus includes: an operation unit which includes an operation surface, and a position designation unit which detects at least one operation of the operation surface and outputs a position designation signal according to the detected position; and a control unit which performs a first control operation based on the position designation signal according to the first operation detected by the operation to the operation surface, continues the first operation, and performs a second control operation which is different from the first control operation with respect to the information processing apparatus, based on the new second operation to the operation surface. According to the information processing apparatus of this configuration, since a second control operation is performed by detecting the operation at the arbitrary timing and in the arbitrary position of the operation surface, user convenience and operability are improved, and a user can intuitively and simply operate the information processing apparatus. In addition, the operation surface is only preferable in order to receive the operation from a user, and therefore it is possible to miniaturize the operation unit, and it is possible to provide an input device having high portability.

(2) In the information processing apparatus according to the aspect described above, the control unit may set a position of a pointer image to be displayed in an image area in which an image display device displays an image, as the first control operation. According to the information processing apparatus of this configuration, since the second control operation is performed in the state where the first operation is continued, the state is not in the state where the operation is not detected on the operation surface, the position of the pointer image is fixed, and it is possible to suppress the occurrence of malfunction.

(3) In the information processing apparatus according to the aspect described above, when a selectable object and the pointer image displayed in the image area are overlapped with each other in a state where the first operation is continued, and the second operation is detected, the control unit may perform a click control operation of selecting the object overlapped with the pointer image, as the second control operation. According to the information processing apparatus of this configuration, even when the operation other than the operation surface being fixed to the specific position of the operation unit is not performed, a user can select an object, and can perform the intuitive operation with a high degree of freedom.

(4) In the information processing apparatus according to the aspect described above, when a selectable object and the pointer image displayed in the image area are overlapped with each other, and a change of the detected position of the first operation and the detected position of the second operation which are simultaneously moved in parallel, is detected, the control unit may perform a drag control operation for changing the position of the object overlapped with the pointer image based on the change of the detected position, as the second control operation. According to the information processing apparatus of this configuration, even when the operation other than the operation surface being fixed to the specific position of the operation unit is not performed, a user can move an object, and can perform the intuitive operation with a high degree of freedom.

(5) In the information processing apparatus according to the aspect described above, when a selectable object and the pointer image displayed in the image area are overlapped with each other, and the change of the detected position of the first operation and the detected position of the second operation which are simultaneously rotated around a virtual specific axis which is orthogonal to the operation surface, is detected, the control unit may perform a rotation control operation for rotating the object overlapped with the pointer image, as the second control operation. According to the information processing apparatus of this configuration, even when the operation other than the operation surface being fixed to the specific position of the operation unit is not performed, a user can rotate an object, and can perform the intuitive operation with a high degree of freedom.

(6) In the information processing apparatus according to the aspect described above, when the specific axis is included in a circle having a line between the detected position of the first operation and the detected position of the second operation as a diameter, the control unit may perform the rotation control operation as the second control operation. According to the information processing apparatus of this configuration, when the rotation control operation is performed and a specific axis is included in the circle having a line between the detected position of the first operation and the detected position of the second operation as a diameter, the object is rotated, and accordingly it is possible to suppress malfunctions from occurring.

(7) In the information processing apparatus according to the aspect described above, the control unit may not detect the change of the detected position of the first operation when an area of a part of a specific image is displayed in the image area, may fix the position of the pointer image as the second control operation when the change of the detected position of the second operation is detected, and may perform a scroll bar control operation of changing the area of the specific image displayed in the image area, based on the change of the detected position of the second operation. According to the information processing apparatus of this configuration, when a user desires to change an area of a part of a specific image displayed in the image area, it is possible to change the area of a part of the specific image displayed in the image area even when the position of the pointer image is not changed, and user convenience and operability is improved.

(8) In the information processing apparatus according to the aspect described above, the control unit may allow the position of the pointer image in the image area to correspond to the detected position of the operation surface. According to the information processing apparatus of this configuration, a user can visually recognize the position of the pointer image, when performing an operation while visually recognizing the operation surface, and accordingly, it is possible to intuitively move the position of the pointer image in the image area, and user convenience is improved.

(9) In the information processing apparatus according to the aspect described above, in a case of a second state in which the operation is detected again, after the state is moved from a first state in which the operation is detected to a state in which the operation is not detected, the control unit may perform first setting for correlating the last position of the pointer image of the first state to the initial position of the pointer image in the second state, regardless of the detected position of the first operation. According to the information processing apparatus of this configuration, even when the operation surface is not visually recognized, a user can intuitively move the position of the pointer image by visually recognizing the image area, and user convenience is improved.

(10) In the information processing apparatus according to the aspect described above, the control unit may switch the first setting and second setting for correlating the position of the pointer image to the detected position of the operation surface, based on the operation. According to the information processing apparatus of this configuration, since the first setting and the second setting are switched with each other according to the intention of a user, user convenience and operability are further improved.

(11) In the information processing apparatus according to the aspect described above, the image display device may be a head mounted display which forms image light based on image data representing the image, allows the image light to be visually recognized by a user as a virtual image, and penetrate external scenery, in a state of being mounted on the head of a user, the information processing apparatus may further include an operation surface determination unit which determines whether or not at least apart of the operation surface is included in the penetrated external scenery, and the control unit may switch to the first setting when it is determined that the operation surface is not included in the penetrated external scenery, and switches to the second setting when it is determined that at least a part of the operation surface is included in the penetrated external scenery. According to the information processing apparatus of this configuration, it is determined whether or not the operation surface is visually recognized by a user, by determining the position relationship between the image display device and the operation surface, and the first setting and the second setting are automatically switched with each other according to the determined result, and therefore user convenience is further improved.

(12) The information processing apparatus according to the aspect described above may further include an acceleration detection unit which is disposed in the operation unit and detects acceleration of the operation unit, the control unit may specify the direction of the operation surface based on the detected acceleration of the operation unit, convert the change of the position designation signal to the position of the pointer image based on a first regulation when the direction of the operation surface is a first direction, and convert the change of the position designation signal to the position of the pointer image based on a second regulation which is different from the first regulation when the direction of the operation unit is a second direction which is different from the first direction. According to the information processing apparatus of this configuration, the input is performed with the direction of the acceleration of the operation as a reference regardless of the direction of the operation surface, and user operability is improved.

(13) In the information processing apparatus according to the aspect described above, the operation to the operation surface may be an operation of touching the operation surface. According to the information processing apparatus of this configuration, the touching operation is employed as the operation of detecting the operation surface, and accordingly operation with fewer malfunctions is performed.

All of the plurality of constituent elements including each aspect of the invention are not compulsory, and modification, removal, replacement with other new constituent elements, and removal of partial limited content can be suitably performed regarding the constituent elements which are a part of the plurality of constituent elements, in order to solve some or all of the problems described above or in order to implement some or all of the advantages described above. Some or all of the technical features included in one aspect of the invention described above can be combined with some or all of the technical features included in the other aspect of the invention described above to serve as one independent aspect of the invention, in order to solve some or all of the problems described above or in order to implement some or all of the advantages described above.

For example, one aspect of the invention can be implemented as an apparatus including one or all of the two elements which are the operation unit and the control unit. That is, this apparatus may or may not include the operation unit. The apparatus may or may not include the control unit. The operation unit, for example, may include an operation surface, and a position designation unit which detects at least one operation of the operation surface and outputs a position designation signal according to the detected position. The control unit, for example, may perform a first control operation based on the position designation signal according to the first operation detected by the operation to the operation surface, continue the first operation, and perform a second control operation which is different from the first control operation with respect to the information processing apparatus, based on the new second operation to the operation surface. This apparatus, for example, can be implemented as the information processing apparatus, but can also be implemented as an apparatus other than the information processing apparatus. According to the aspect, it is possible to solve at least one problem among various problems, such as improvement in ease of operability of the device, integration of the device, or improvement of user convenience of the apparatus. Some or all of the technical features of each aspect of the information processing apparatus can be applied to this apparatus.

The invention can be implemented as various aspects other than the information processing apparatus. For example, the invention can be implemented in the aspect of a head mounted display, a control method of an information processing apparatus or a head mounted display, an information processing system, a head mounted type display system, a computer program for implementing an information processing system or a head mounted type display system, a recording medium with the computer program recorded therein, and a data signal including the computer program implemented in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of Head Mounted Display

Figure 1:
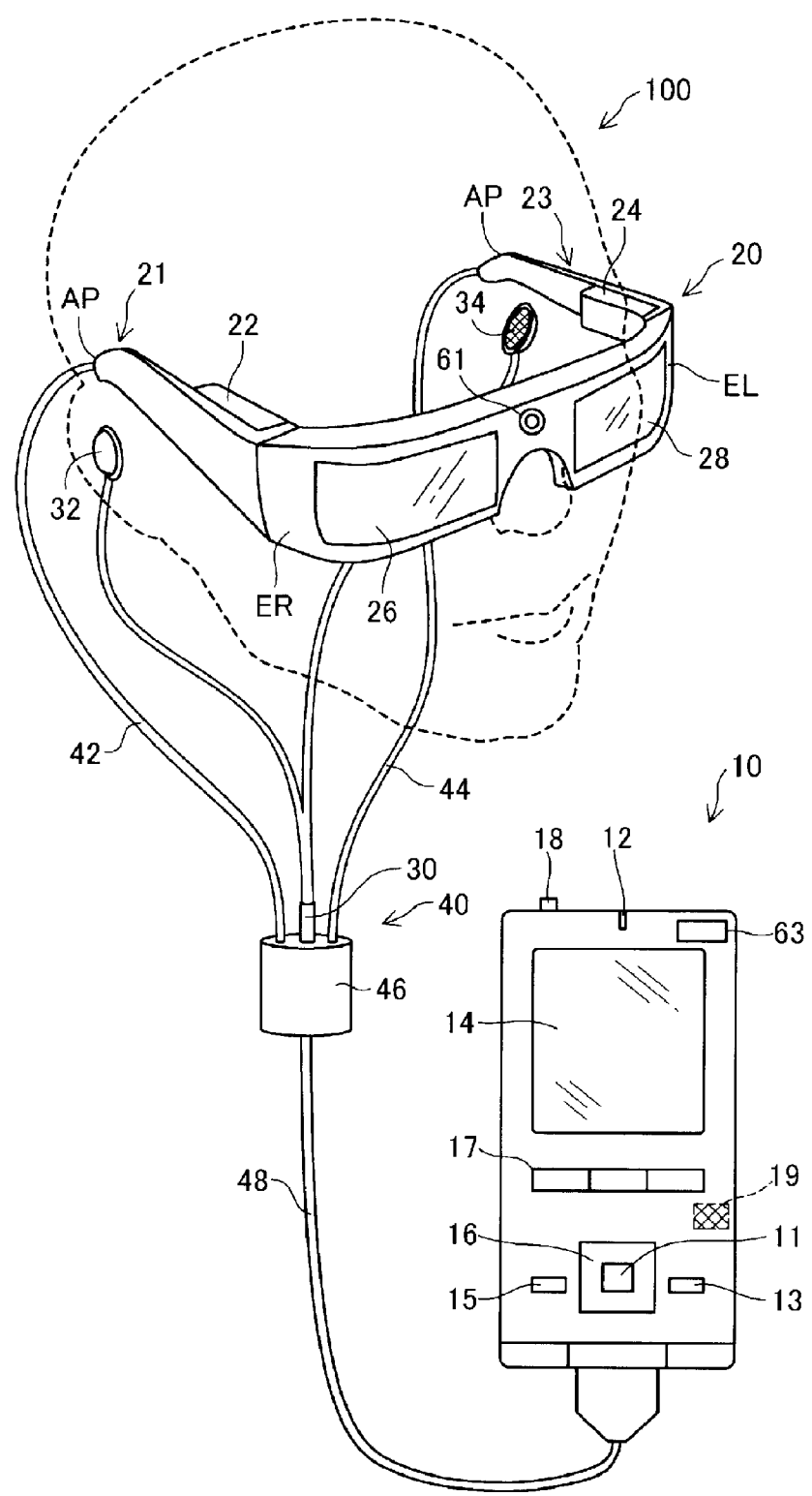
FIG. 1 is an explanatory diagram showing an appearance configuration of a head mounted display.

FIG. 1 is an explanatory diagram showing an appearance configuration of a head mounted display 100. The head mounted display 100 is a display device to be mounted on the head, and is also called a head mounted display (HMD). The head mounted display 100 of the embodiment is an optical transmission type head mounted display which allows a user to visually recognize a virtual image and to directly visually recognize external scenery at the same time. In the present specification, the virtual image which is visually recognized by a user using the head mounted display 100 is also referred to as a "display image" for the sake of convenience. In addition, emission of image light generated based on image data is also referred to as "display of an image".

The head mounted display 100 includes an image display unit 20 which allows a user to visually recognize a virtual image in a state of being mounted on the head of a user, and a control unit 10 (controller 10) which controls the image display unit 20.

The image display unit 20 is a body to be mounted on the head of a user, and has the shape of glasses in the embodiment. The image display unit 20 includes a right holding unit 21, a right display driving unit 22, a left holding unit 23, a left display driving unit 24, a right optical image display unit 26, a left optical image display unit 28, and an infrared light emitting unit 61. The right optical image display unit 26 and the left optical image display unit 28 are disposed so as to be positioned in front of right and left eyes of a user when the image display unit 20 is mounted thereon. One end of the right optical image display unit 26 and one end of the left optical image display unit 28 are connected to each other in a position between the eyebrows of a user when the image display unit 20 is mounted thereon.

The right holding unit 21 is a member which is provided extending from an end portion ER which is the other end of the right optical image display unit 26 to a position corresponding to a temple of a user when the image display unit 20 is mounted on a user. In the same manner as described above, the left holding unit 23 is a member which is provided extending from an end portion EL which is the other end of the left optical image display unit 28 to a position corresponding to a temple of a user when the image display unit 20 is mounted thereon. The right holding unit 21 and the left holding unit 23 hold the image display unit 20 on the head of a user, as temples do for glasses.

The right display driving unit 22 and the left display driving unit 24 are disposed at a side facing the head of a user when the image display unit 20 is mounted thereon. Hereinafter, the right holding unit 21 and the left holding unit 23 are also collectively simply referred to as the "holding units", the right display driving unit 22 and the left display driving unit 24 are also collectively simply referred to as the "display driving units", and the right optical image display unit 26 and the left optical image display unit 28 are also collectively simply referred to as the "optical image display units".

The display driving units 22 and 24 include liquid crystal displays 241 and 242 (hereinafter, also referred to as "LCDs 241 and 242"), projection optical systems 251 and 252, and the like (see FIG. 2). The configuration of the display driving units 22 and 24 will be described in detail later. The optical image display units 26 and 28 as optical members include light guide plates 261 and 262 (see FIG. 2) and dimming plates. The light guide plates 261 and 262 are formed of a light transmissive resin material and the like, and guide image light output from the display driving units 22 and 24 to eyes of a user. The dimming plates are optical elements having a thin plate shape, and are disposed so as to cover the front side of the image display unit 20 which is a side opposite the side of eyes of a user. The dimming plates protect the light guide plates 261 and 262, and suppress damage or attachment of dirt on the light guide plates 261 and 262. In addition, by adjusting the light transmittance of the dimming plates, an amount of external light entering into eyes of a user can be adjusted, and a virtual image can be adjusted so as to be easily visually recognized. The dimming plates can be omitted.

The infrared light emitting unit 61 emits infrared light from the direction of the eyes of a user with the image display unit 20 mounted thereon to the optical image display units 26 and 28. When the infrared light emitted by the infrared light emitting unit 61 is received by an infrared light receiving unit 63 formed in the control unit 10 which will be described later, it is determined that the control unit 10 is in a predetermined range from the infrared light emitting unit 61 and the control unit 10 is visually recognized by a user.

The image display unit 20 further includes a connection unit 40 for connecting the image display unit 20 to a control unit 10. The connection unit 40 includes a main body cord 48 connected to the control unit 10, a right cord 42, a left cord 44, and a coupling member 46. The right cord 42 and the left cord 44 are two cords branched from the main body cord 48. The right cord 42 is inserted into a housing of the right holding unit 21 from an end portion AP of the right holding unit 21 in an extension direction, and is connected to the right display driving unit 22. In the same manner as described above, the left cord 44 is inserted into a housing of the left holding unit 23 from an end portion AP of the left holding unit 23 in an extension direction, and is connected to the left display driving unit 24. The coupling member 46 is provided at a branched point of the main body cord 48, and the right cord 42 and the left cord 44, and includes a jack for connecting an earphone plug 30. A right earphone 32 and a left earphone 34 extend from the earphone plug 30.

The image display unit 20 and the control unit 10 transmit various signals through the connection unit 40. An end portion of the main body cord 48 at a side opposite the coupling member 46, and the control unit 10 include connectors (not shown) fitted to each other, respectively. The control unit 10 and the image display unit 20 are connected to each other or disconnected from each other, by fitting of the connector of the main body cord 48 and the connector of the control unit 10 to each other or releasing fitting thereof from each other. Metal cables or optical fiber can be used as the right cord 42, the left cord 44, and the main body cord 48, for example.

The control unit 10 is a device for controlling the head mounted display 100. The control unit 10 includes a determination key 11, a lighting unit 12, a display switching key 13, a luminance switching key 15, a direction key 16, a menu key 17, a power switch 18, a track pad 14, an acceleration sensor 19, and the infrared light receiving unit 63. The determination key 11 detects a pressing operation and outputs a signal for determining content operated in the control unit 10. The lighting unit 12 notifies an operation state of the head mounted display 100 of a light emitting state thereof. The operation state of the head mounted display 100 is, for example, the ON or OFF state of the power. A light emitting diode (LED) is used as the lighting unit 12, for example. The display switching key 13 detects a pressing operation and outputs a signal for switching the display mode of a moving content image to 3D or 2D, for example. The luminance switching key 15 detects a pressing operation and outputs a signal for increasing or decreasing luminance of the image display unit 20. The direction key 16 detects a pressing operation for a key corresponding to the up, down, right, and left directions and outputs a signal corresponding to the detected content. The power switch 18 detects a sliding operation of a switch to switch a power state of the head mounted display 100.

The track pad 14 detects a touching operation of the fingers of a user on the operation surface and outputs a signal corresponding to the detected content. As the detected touching operation, there is a change in a touching position and an operation for performing a click control operation which will be described later, for example. In the head mounted display 100, various control operations such as a control operation of the display image displayed on the image display unit 20 are performed by the touching operation. Various track pads such as an electrostatic, pressure-detection type, or optical track pads can be used as the track pad 14. The track pad 14 corresponds to an operation surface in the aspect. The touching operation corresponds to an operation detected on the operation surface in the aspect, and the touching position corresponds to a detected position in the aspect. The acceleration sensor 19 acquires the acceleration (for example, gravitational acceleration) acting on the control unit 10. In the embodiment, the acceleration sensor 19 acquires the acceleration acting on the control unit 10, on a regular basis, once every 0.5 seconds. The infrared light receiving unit 63 receives infrared light emitted by the infrared light emitting unit 61 formed in the image display unit 20. When the infrared light receiving unit 63 receives infrared light, the infrared light receiving unit transmits a signal showing reception of the infrared light to an input determination unit (FIG. 2) which will be described later. The acceleration sensor 19 corresponds to an acceleration detection unit in the aspect.

Figure 2:
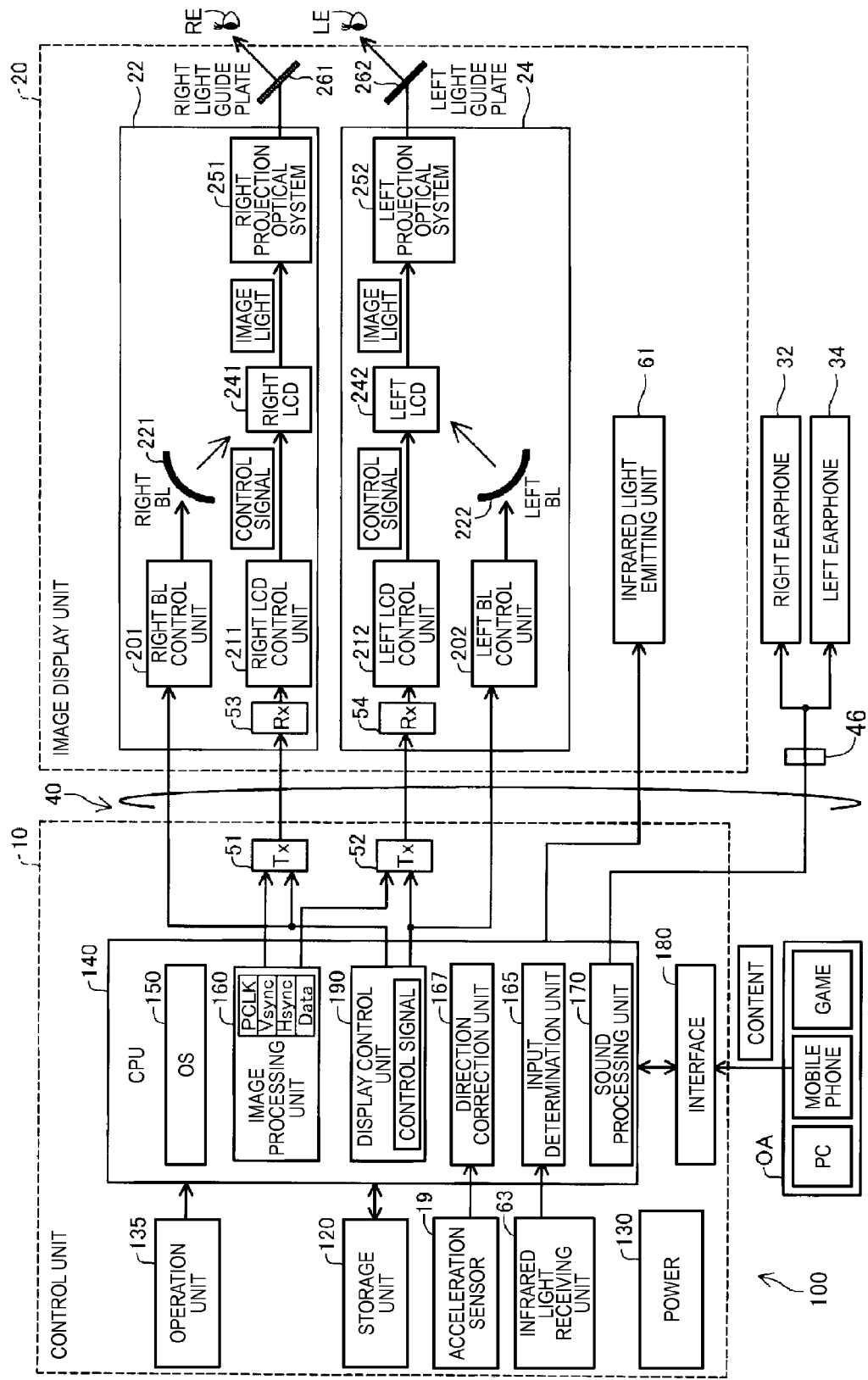
FIG. 2 is a functional block diagram showing a configuration of a head mounted display.

FIG. 2 is a functional block diagram showing a configuration of the head mounted display 100. As shown in FIG. 2, the control unit 10 includes an operation unit 135, a power 130, a storage unit 120, the acceleration sensor 19, the infrared light receiving unit 63, a CPU 140, an interface 180, a transmission unit 51 (Tx 51), and a transmission unit 52 (Tx 52). The operation unit 135 receives an operation from a user, and is configured with the determination key 11, the display switching key 13, the track pad 14, the luminance switching key 15, the direction key 16, the menu key 17, and the power switch 18.

The power 130 supplies power to each unit of the head mounted display 100. A secondary battery can be used as the power 130, for example. The storage unit 120 stores various computer programs. The storage unit 120 is configured with a ROM or a RAM. The CPU 140 reads out and executes the computer programs stored in the storage unit 120 to function as an operating system 150 (OS 150), a display control unit 190, an image processing unit 160, a sound processing unit 170, an input determination unit 165, and a direction correction unit 167.

The display control unit 190 generates a control signal for controlling the right display driving unit 22 and the left display driving unit 24. In detail, the display control unit 190 separately controls ON and OFF states of driving of the right LCD 241 by a right LCD control unit 211, the ON and OFF states of the driving of a right backlight 221 by a right backlight control unit 201, the ON and OFF states of the driving of the left LCD 242 by a left LCD control unit 212, and the ON and OFF states of the driving of a left backlight 222 by a left backlight control unit 202, with the control signals. Accordingly, the display control unit 190 controls generation and emission of the image light by each of the right display driving unit 22 and the left display driving unit 24. For example, the display control unit 190 generates the image light for both of the right display driving unit 22 and the left display driving unit 24, generates the image light for one thereof, or does not generate the image light for both thereof. The display control unit 190 transmits the respective control signals with respect to the right LCD control unit 211 and the left LCD control unit 212 through the transmission units 51 and 52. In addition, the display control unit 190 transmits the respective control signals with respect to the right backlight control unit 201 and the left backlight control unit 202.

The image processing unit 160 acquires an image signal included in the content. The image processing unit 160 separates a synchronization signal such as a vertical synchronization signal VSync or a horizontal synchronization signal HSync from the acquired image signal. In addition, the image processing unit 160 generates a clock signal PCLK in accordance with the separated vertical synchronization signal VSync or the horizontal synchronization signal HSync, by using a phase locked loop (PLL) circuit (not shown) or the like. The image processing unit 160 converts an analog image signal with the separated synchronization signal into a digital image signal using an A/D conversion circuit (not shown) or the like. After that, the image processing unit 160 stores the converted digital image signal in a DRAM in the storage unit 120 for each frame, as image data (RGB data) of a target image. The image processing unit 160, if necessary, may execute an image process such as a resolution conversion process, various color tone correction process such as adjustment of luminance and chroma, or a keystone correction process, with respect to the image data.

The image processing unit 160 transmits the generated clock signal PCLK, the vertical synchronization signal VSync, the horizontal synchronization signal HSync, and the image data stored in the DRAM in the storage unit 120 through the transmission units 51 and 52. The image data transmitted through the transmission unit 51 is also referred to as "image data for the right eye", and the image data transmitted through the transmission unit 52 is also referred to as "image data for the left eye". The transmission units 51 and 52 function as a transceiver for serial transmission between the control unit 10 and the image display unit 20.

The image processing unit 160 displays an image corresponding to various operations in a maximum image display area PN (hereinafter, also simply referred to as a "display area PN") in which a virtual image can be visually recognized by a user in the optical image display units 26 and 28. The image processing unit 160, for example, displays a pointer image in the display area PN, according to the detected touching operation, and changes the display position of the pointer image, according to the change of the touching position on the track pad 14. In the embodiment, there are two systems which are an absolute coordinate system and a relative coordinate system for a relationship system representing a corresponding position relationship between the touching position of the track pad 14 and the display position of the pointer image in the display area PN. The relative coordinate system and the absolute coordinate system will be described later in detail.

The input determination unit 165 determines the input based on the touching operation of the track pad 14 and a pressing operation of the menu key 17. Examples of the determined input in the touching operation detected on the track pad 14 include the change of the touching position or the touching time for which the finger of a user touches. When the infrared light receiving unit 63 receives the infrared light emitted by the infrared light emitting unit 61, the input determination unit 165 determines that the control unit 10 is in a predetermined position with respect to the image display unit 20. When the infrared light receiving unit 63 does not receive the emitted infrared light, the input determination unit 165 determines that the control unit 10 is not in a predetermined position with respect to the image display unit 20. When it is determined that the control unit 10 is in the predetermined position, the input determination unit 165 sets the relationship system to the absolute coordinate system, and transmits a signal obtained by converting the change of the touching position to the change of the display position of the pointer image based on the absolute coordinate system, to the image processing unit 160. When it is determined that the control unit 10 is not in the predetermined position, the input determination unit 165 sets the relationship system to the relative coordinate system, and transmits a signal obtained by converting the change of the touching position to the change of the display position of the pointer image based on the relative coordinate system, to the image processing unit 160. The image processing unit 160 sets the display position of the pointer image displayed in the display area PN, based on the transmitted signal. The infrared light emitting unit 61, the infrared light receiving unit 63, and the input determination unit 165 correspond to an operation surface determination unit in the aspect.

The direction correction unit 167 specifies a direction of the control unit 10, based on a signal showing the acceleration (for example, gravitational acceleration) acting on the control unit 10, which is transmitted from the acceleration sensor 19. The direction correction unit 167 determines a conversion angle of the correction performed for correlating the direction of the change of the touching position to the direction of the change of the display position of the pointer image, based on an angle formed by the direction of the control unit 10 and the direction of gravity. The input determination unit 165 changes the display position of the pointer image, according to the change of the touching position determined by the direction correction unit 167, based on the determined conversion angle. The input determination unit 165, the image processing unit 160, and the direction correction unit 167 correspond to a part of a control unit in the aspect, and the conversion angle corresponds to a first regulation and a second regulation in the aspect.

In the embodiment, the absolute coordinate system and the relative coordinate system can be switched with each other. When the operation unit 135 receives the predetermined operation, or the determination of the input determination unit 165 of whether or not the control unit 10 is in the predetermined position with respect to the image display unit 20, the absolute coordinate system and the relative coordinate system are switched with each other. In the absolute coordinate system, the track pad 14 as the operation surface and the display area PN correspond to each other one to one. Herein, the corresponding of the track pad 14 and the display area PN to each other one to one, means the corresponding of a coordinate position in the area of the track pad 14 and a coordinate position in the display area PN to each other one to one. For example, in the case of the touching state where the touching operation is detected, the pointer image is displayed in a position of the display area PN corresponding to the touching position. In the case of a non-touching state where the touching operation is not detected, the pointer image is not displayed in the display area PN. In the embodiment, when the state changes from the touching state to the non-touching state, the pointer image is displayed in the display area PN for a certain time, and when the certain time has elapsed and the non-touching state is continued, the pointer image displayed in the display area PN is not displayed. In the absolute coordinate system, when the touching operation is detected in the non-touching state, the pointer image is displayed in the coordinate position of the display area PN corresponding to the touching position. When the new touching operation is detected in the certain time during which the pointer image is displayed after the state is changed from the touching state to the non-touching state, the pointer image displayed until the new touching operation is detected is not displayed, and the pointer image is displayed in the coordinate position of the display area PN corresponding to the newly detected touching position. In the absolute coordinate system, since the touching position of the track pad 14 and the coordinate position of the display area PN correspond to each other one to one, a user can visually recognize the display position of the pointer image when performing an operation while visually recognizing the track pad 14, and accordingly, it is possible to intuitively move the display position of the pointer image, and user convenience is improved. Setting of the relationship system to the absolute coordinate system corresponds to performing second setting in the aspect. The state in which the touching state is initially detected corresponds to a first state in the aspect, and the state in which the state is changed to the touching state again after the state is changed from the touching state to the non-touching state corresponds to a second state in the aspect.

In the relative coordinate system, the touching position of the touching operation and the coordinate position of the display area PN do not correspond to each other one to one, unlike the absolute coordinate system. When the touching position and the coordinate position of the display area PN do not correspond to each other one to one, for example, in a case where the touching position of the track pad 14 is changed in a horizontal direction from the left end to the right end of the track pad 14, the display position of the pointer image in the display area PN is moved in the horizontal direction from the left end to the center (moved in the horizontal direction from the left end at a position of 50% of the entire distance thereof). That is, even when the touching position is changed from the left end to the right end of the track pad 14, the display position of the pointer image is not moved from the left end to the right end, and the touching position and the coordinate position of the display area PN do not correspond to each other one to one. A movement amount of the display position of the pointer image with respect to a changed amount of the touching position can be arbitrarily set. Accordingly, in the relative coordinate system, the changed amount of the touching position and the movement amount of the display position of the pointer image can be set to a user's taste, and user convenience is improved. In the relative coordinate system, when the state is changed from the touching state to the non-touching state and the certain time has elapsed, the input determination unit 165 does not display the pointer image and stores the display position of the pointer image which is not displayed. When the state is changed from the non-touching state to the touching state again, the input determination unit 165 displays the pointer image again in the stored display position of the pointer image, regardless of the newly detected touching position in the touching operation. Accordingly, in the relative coordinate system, even when the touching state and the non-touching state are changed and the pointer image is temporarily not displayed in the non-touching state, the pointer image is displayed in the display position stored in the last touching state. Therefore, even when the track pad 14 is not visually recognized, a user can intuitively move the pointer image by visually recognizing the display area PN, and user convenience is improved. Setting of the relationship system to the relative coordinate system corresponds to performing first setting in the aspect.

The sound processing unit 170 acquires a sound signal included in the content, amplifies the acquired sound signal, and supplies the sound signal to a speaker (not shown) in the right earphone 32 and a speaker (not shown) in the left earphone 34 connected to the coupling member 46. For example, in the case that a Dolby (trademark) system is used, a process with respect to the sound signal is performed, and different sounds with changed frequencies, for example, are output from the right earphone 32 and the left earphone 34.

The interface 180 (FIG. 2) is an interface for connecting various external devices OA which are supply sources of the content, to the control unit 10. As the external devices OA, a personal computer (PC), a mobile phone, a game terminal, and the like are used, for example. As the interface 180, a USB interface, a micro USB interface, an interface for a memory card, or the like can be used, for example.

The image display unit 20 includes the right display driving unit 22, the left display driving unit 24, the right light guide plate 261 as the right optical image display unit 26, the left light guide plate 262 as the left optical image display unit 28, and the infrared light emitting unit 61.

The right display driving unit 22 includes a reception unit 53 (Rx 53), the right backlight control unit 201 (right BL control unit 201) and the right backlight 221 (right BL 221) functioning as light sources, the right LCD control unit 211 and the right LCD 241 functioning as display elements, and the right projection optical system 251. The right backlight control unit 201 and the right backlight 221 function as the light sources. The right LCD control unit 211 and the right LCD 241 function as the display elements. The right backlight control unit 201, the right LCD control unit 211, the right backlight 221, and the right LCD 241 are also collectively referred to as an "image light generation unit".

The reception unit 53 functions as a receiver for serial transmission between the control unit 10 and the image display unit 20. The right backlight control unit 201 drives the right backlight 221 based on the input control signal. The right backlight 221 is a luminescent body such as an LED or an electroluminescence (EL) device, for example. The right LCD control unit 211 drives the right LCD 241 based on the clock signal PCLK, the vertical synchronization signal VSync, the horizontal synchronization signal HSync, and the image data for a right eye input through the reception unit 53. The right LCD 241 is a transmission type liquid crystal panel in which a plurality of pixels are disposed in a matrix form.

The right projection optical system 251 is configured with a collimating lens which converts the image light emitted from the right LCD 241 into a luminous flux in a parallel state. The right light guide plate 261 as the right optical image display unit 26 reflects the image light output from the right projection optical system 251 along a predetermined light path and guides the reflected image light to the right eye RE of a user. The right projection optical system 251 and the right light guide plate 261 are also collectively referred to as a "light guide unit".

The left display driving unit 24 has the same configuration as that of the right display driving unit 22. The left display driving unit 24 includes a reception unit 54 (Rx 54), the left backlight control unit 202 (left BL control unit 202) and the left backlight 222 (left BL 222) functioning as light sources, the left LCD control unit 212 and the left LCD 242 functioning as display elements, and the left projection optical system 252. The left backlight control unit 202 and the left backlight 222 function as the light sources. The left LCD control unit 212 and the left LCD 242 function as the display elements. The left backlight control unit 202, the left LCD control unit 212, the left backlight 222, and the left LCD 242 are collectively referred to as an "image light generation unit". The left projection optical system 252 is configured with a collimating lens which converts the image light emitted from the left LCD 242 into a luminous flux in a parallel state. The left light guide plate 262 as the left optical image display unit 28 reflects the image light output from the left projection optical system 252 along a predetermined light path and guides the reflected image light to the left eye LE of a user. The left projection optical system 252 and the left light guide plate 262 are also collectively referred to as a "light guide unit".

Figure 3:
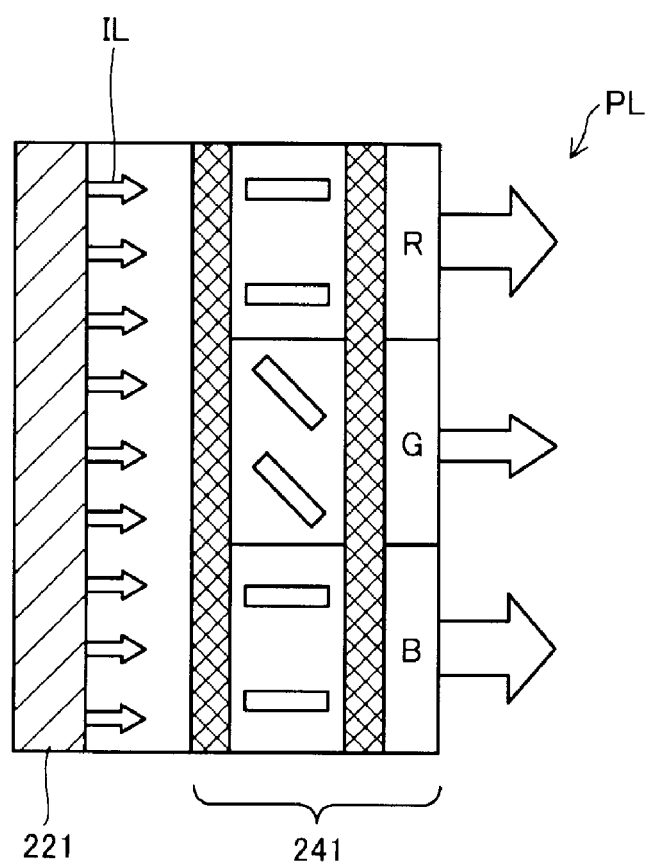
FIG. 3 is an explanatory diagram showing a state of image light emitted by an image light generation unit.

FIG. 3 is an explanatory diagram showing a state of image light emitted by the image light generation unit. The right LCD 241 drives the liquid crystal in each pixel position disposed in a matrix form to change the transmittance of the light penetrating the right LCD 241, and accordingly modulates illumination light IL emitted from the right backlight 221 into effective image light PL showing an image. The left image light generation unit has the same configuration. As shown in FIG. 3, the backlight system is used in the embodiment, but the image light may be emitted using a front light system or a reflection system.

A-2. Operation Control Process

FIGS. 4 to 11 are explanatory diagrams showing flows of an operation control process. The operation control process is a process of changing the image displayed in the display area PN according to the touching operation and performing a control operation based on the image selected by various operations.

Figure 12:
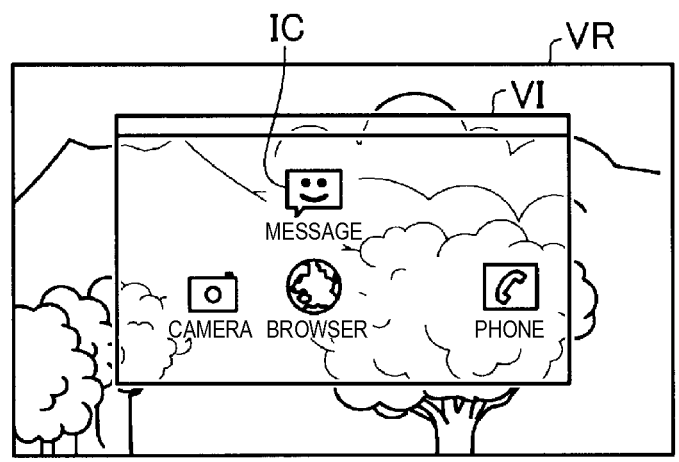
FIG. 12 is a schematic view of a visual field visually recognized by a user when an operation screen is displayed.

In the operation control process, first, the image processing unit 160 displays a screen for various operations which is an image as an operation target of a user in the display area PN (Step S10). FIG. 12 is a schematic view of a visual field VR visually recognized by a user when the operation screen is displayed. A user visually recognizes an operation screen VI displayed in the display area PN. In the embodiment, the operation screen VI is displayed in the entire area of the display area PN. A user can visually recognize the part in the visual field VR of a user which is a part other than the part where the operation screen VI is displayed, as external scenery through the right optical image display unit 26 and the left optical image display unit 28. In the head mounted display 100 of the embodiment, a user can even visually recognize the part where the operation screen VI is displayed, as external scenery projected from the back of the operation screen VI. As shown in FIG. 12, the operation screen VI includes icons IC which is a plurality of selectable images. For example, the operation screen VI shown in FIG. 12 includes a "message", a "camera", a "browser", and a "phone", as the icons IC.

When the operation screen VI is displayed in the display area PN (Step S10 of FIG. 4), the input determination unit 165 determines whether or not the control unit 10 in which the operation unit 135 is formed is in the predetermined position with respect to the image display unit 20 (Step S12). When it is determined that the control unit 10 is in the predetermined position with respect to the image display unit 20 (Step S12: YES), the input determination unit 165 sets the relationship system to the absolute coordinate system (Step S14). When it is determined that the control unit 10 is not in the predetermined position with respect to the image display unit 20 (Step S12: NO), the input determination unit 165 sets the relationship system to the relative coordinate system (Step S16).

Figure 13:
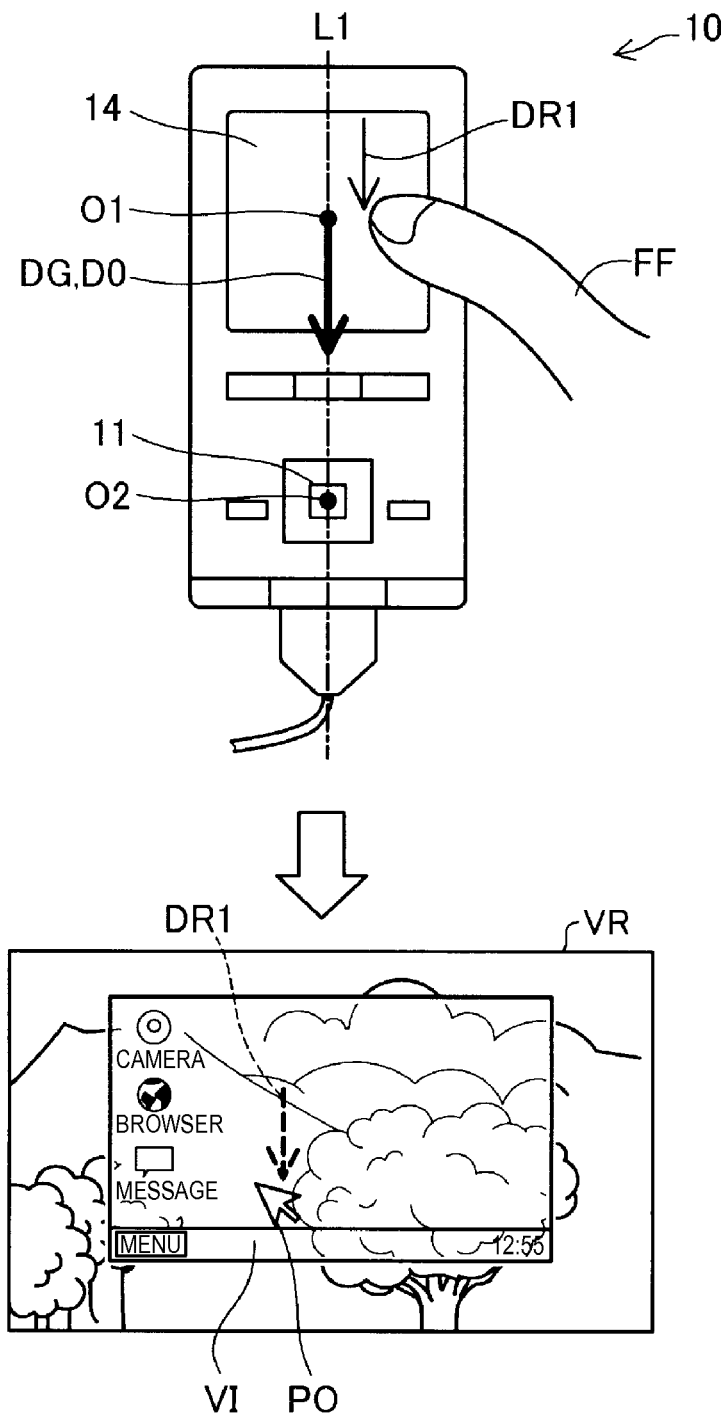
FIG. 13 is an explanatory diagram of a conversion angle.
Figure 14:
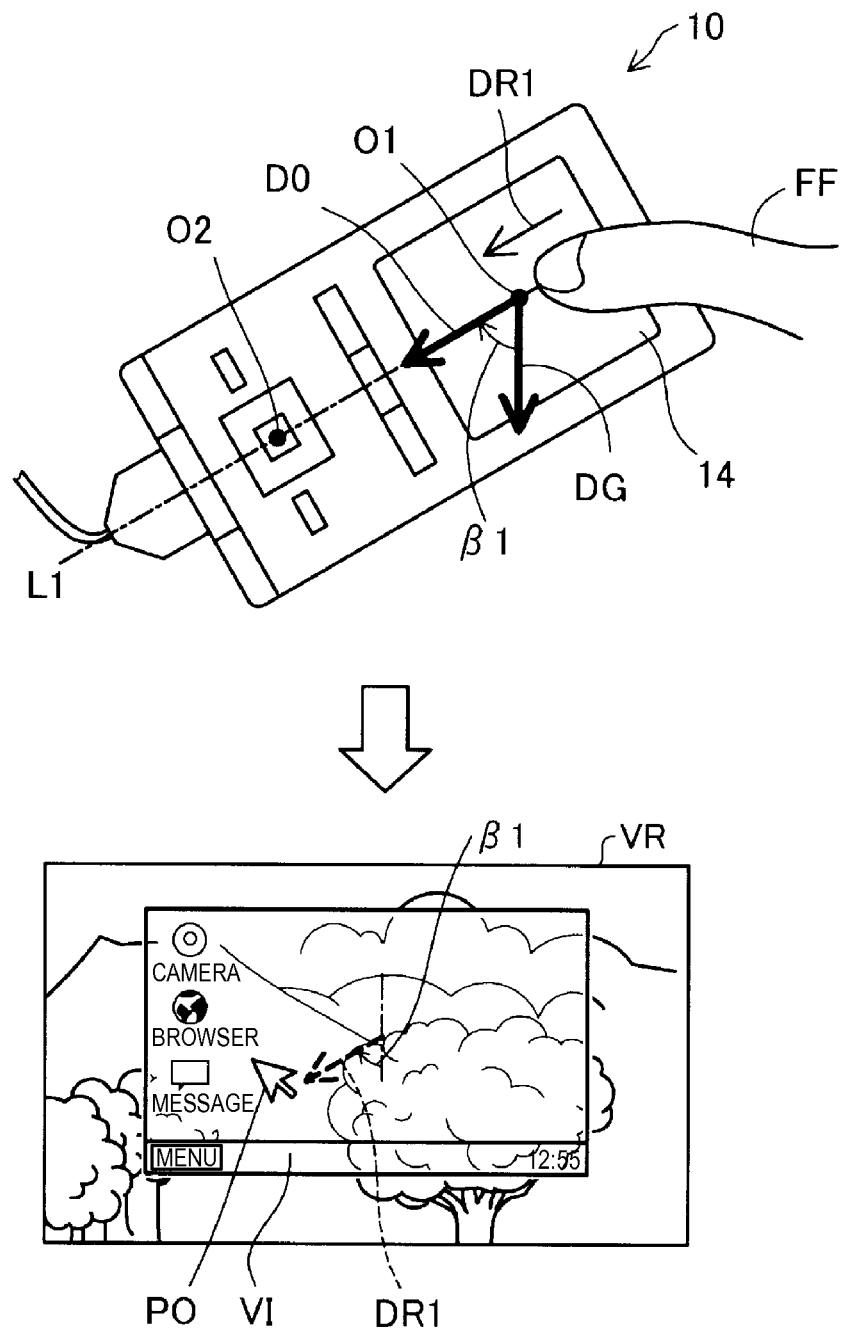
FIG. 14 is an explanatory diagram of a conversion angle.

When the relationship system is set to the absolute coordinate system or the relative coordinate system (Step S14 or Step S16), the direction correction unit 167 sets the conversion angle based on the specified direction of the control unit 10 (Step S18). FIGS. 13 and 14 are explanatory diagrams of conversion angles. The visual field VR shown in FIGS. 13 and 14 is an example, and is different from the visual field VR shown in FIG. 12. FIG. 13 shows a linear line L1 passing through a center O1 of the track pad 14 and a center O2 of the determination key 11, the direction of gravity DG, and an operation direction DR1 of a forefinger FF of a user moved on the track pad 14, in the control unit 10. As shown in FIG. 13, the direction of gravity DG and the operation direction DR1 are the same direction. In addition, FIG. 13 shows the visual field VR of a user when the touching operation is detected. In the embodiment, the conversion angle is set as 0 degrees as the initial setting, when a reference direction D0 from the center O1 to the center O2 along the linear line L1 of the track pad 14 and the direction of gravity DG are the same direction. Accordingly, the conversion angle is 0 degrees when the operation direction DR1 is the same direction as the reference direction D0, and thus, the input determination unit 165 displays the movement of the forefinger FF along the operation direction DR1 on the image processing unit 160, as the movement along the operation direction DR1, in the same manner, based on the conversion angle determined by the direction correction unit 167.

FIG. 14 shows an example in which the conversion angle to be corrected by the direction correction unit 167 is an angle other than 0 degrees, and when the reference direction D0 and the direction of gravity DG are not the same direction the control unit 10 is inclined with respect to the direction of gravity compared to the initial setting. As shown in FIG. 14, since the control unit 10 is inclined, the direction of gravity DG and the reference direction D0 form an angle β1. The angle β1 is 60 degrees. In this case, the direction correction unit 167 corrects the movement of the forefinger FF in the operation direction DR1 along the reference direction D0, by the amount of the angle β1 which is the conversion angle, by setting a clockwise angle from the direction of gravity DG as a positive angle using the direction of gravity DG as a reference. That is, even when a relative direction of the operation direction DR1 with respect to the track pad 14 is the same as the reference direction D0, the change of the display position of the pointer PO displayed on the image processing unit 160 based on the conversion angle specified by the input determination unit 165 is different depending on the direction of gravity DG acquired by the acceleration sensor 19. As shown in the operation screen VI of FIG. 14, the input determination unit 165 changes the display position of the pointer PO, based on the conversion angle determined by the direction correction unit 167.

When the conversion angle is determined (Step S18 of FIG. 4), the track pad 14 monitors the detection of a first touching operation (Step S20). The first touching operation is the touching operation initially detected in the non-touching state. When the first touching operation is not detected (Step S20: NO), processes subsequent to Step S12 are repeated. When the first touching operation is detected (Step S20: YES), the input determination unit 165 displays the pointer PO in the display area PN (Step S22). When the touching position of the track pad 14 of the first touching operation (hereinafter, also simply referred to as a "first touching position") is changed in the state where the pointer image is displayed, the input determination unit 165 changes the display position of the pointer PO according to the change of the first touching position corrected by the conversion angle (Step S24). Next, the input determination unit 165 determines whether or not the pointer PO in the changed display position is overlapped with any of the displayed icons IC (Step S26). The first touching operation corresponds to a first operation in the aspect, and the change of the display position of the pointer PO according to the change of the first touching position corresponds to a first control operation in the aspect.

Figure 15:
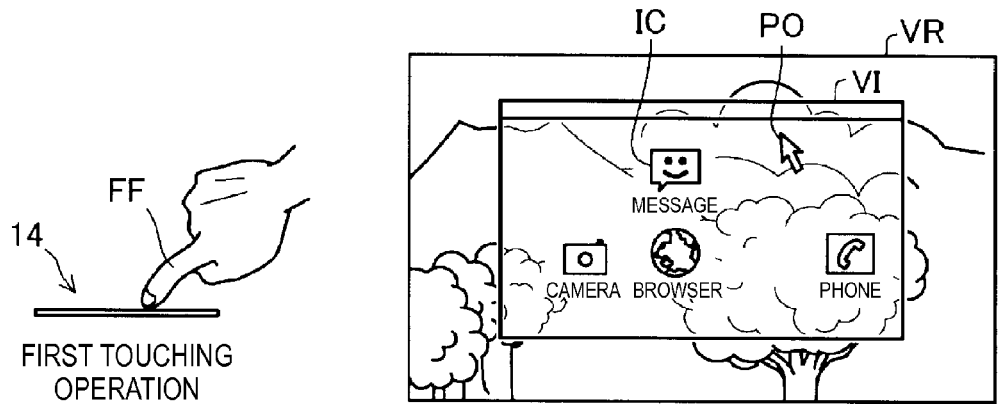
FIG. 15 is an explanatory diagram showing a touching state of a first touching operation and the visual field of a user.
Figure 16:
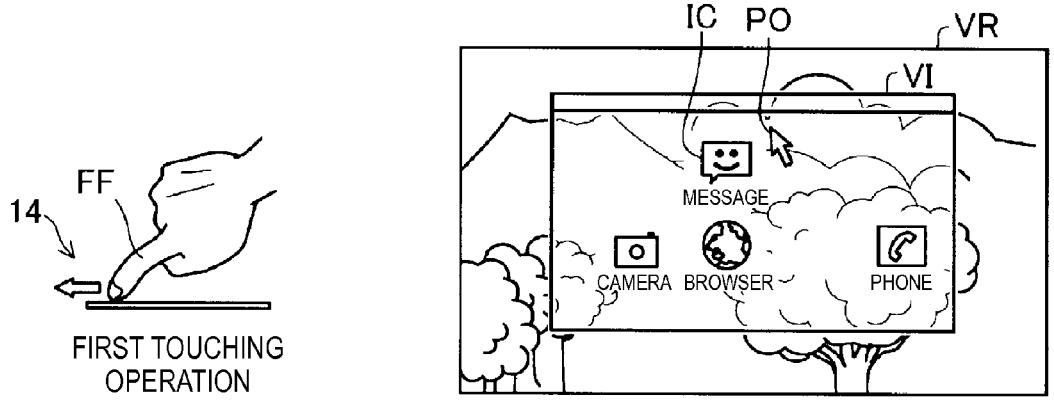
FIG. 16 is an explanatory diagram showing a touching state of a first touching operation and the visual field of a user.
Figure 17:
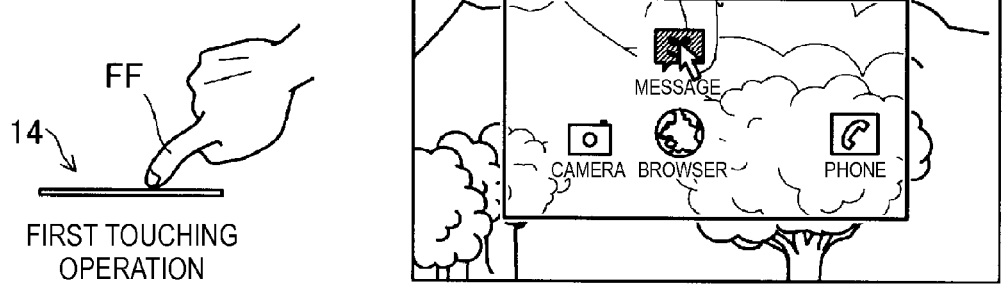
FIG. 17 is an explanatory diagram showing a touching state of a first touching operation and the visual field of a user.

FIGS. 15 to 17 are explanatory diagrams showing the touching state of the first touching operation and the visual field VR of a user. As shown in FIG. 15, the track pad 14 detects touching by a user as the first touching operation. In the embodiment, the right forefinger FF of a user touches the track pad 14 as the first touching operation. In addition, FIG. 15 shows the visual field VR visually recognized by a user, when the first touching operation is detected. As shown in the operation screen VI of FIG. 15, the image processing unit 160 displays the pointer PO in the display area PN according to the first touching operation. As shown in FIGS. 15 to 17, since the control unit 10 is not visually recognized by a user and the control unit 10 is not in the predetermined position with respect to the image display unit 20, the relationship system is set as the relative coordinate system. As shown in FIG. 16, when the first touching position of the forefinger FF changes, the display position of the pointer PO changes. In the embodiment, as a result of the change of the first touching position, as shown in FIG. 17, when the pointer PO is overlapped with the "message" which is the icon IC, the color of the overlapped icon IC0 changes. The change of the color of the overlapped icon IC0 shows that the overlapped icon IC0 is in a selectable state. A user performs various operations which will be described later with respect to the track pad 14 in a state where the pointer PO is overlapped with the icon IC, thus, it is possible to perform the operation relating to the icon IC.

Figure 4:
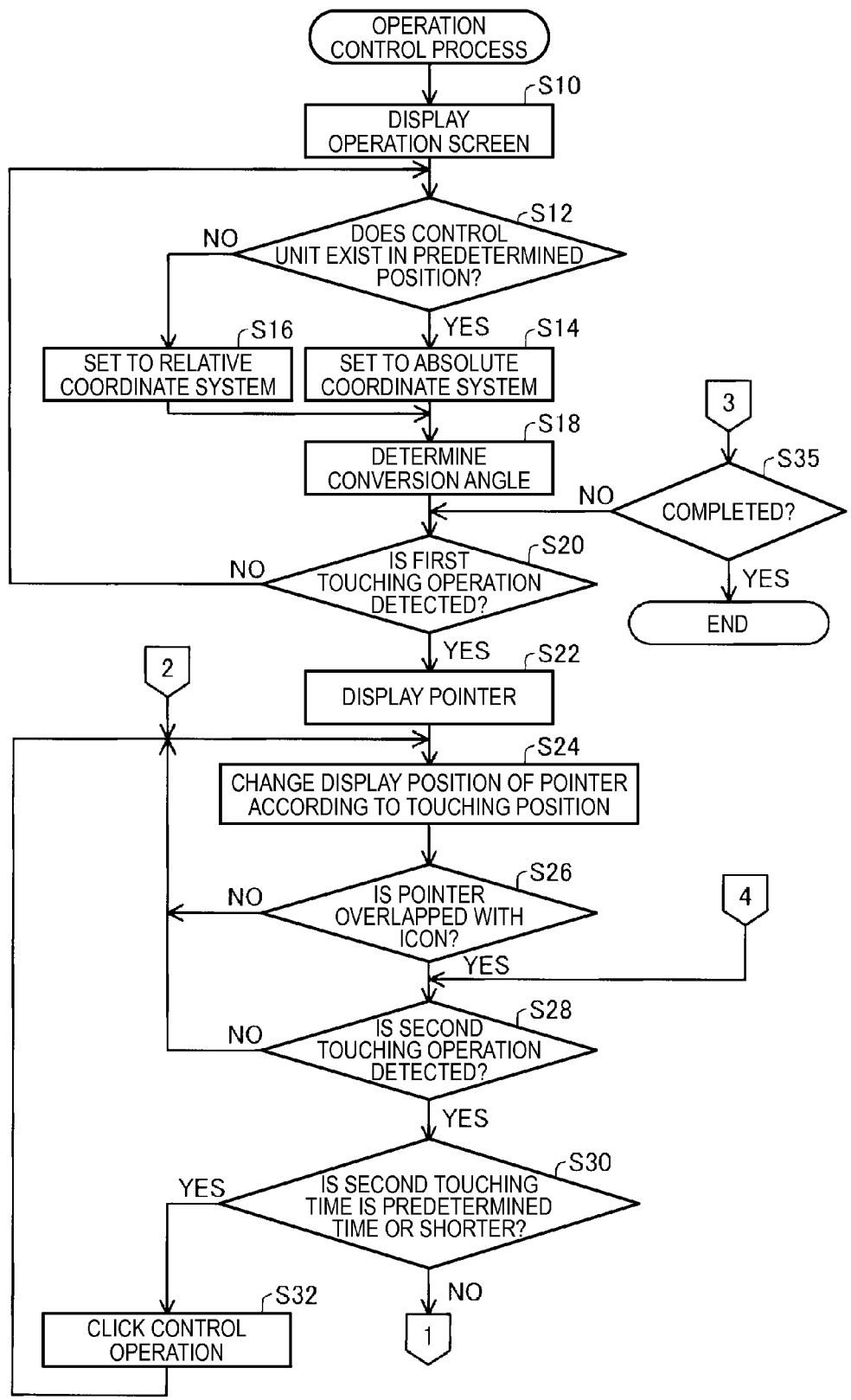
FIG. 4 is an explanatory diagram showing a flow of an operation control process.

In the process in Step S26 of FIG. 4, when it is determined that the pointer PO is not overlapped with any of the icons IC (Step S26: NO), the processes subsequent to Step S24 are performed. When it is determined that the pointer PO is overlapped with any of the icons IC (Step S26: YES), the track pad 14 monitors detection of a second touching operation (Step S28). When the second touching operation is not detected (Step S28: NO), the processes subsequent to Step S24 are performed again. When the second touching operation is detected (Step S28: YES), the input determination unit 165 determines whether or not the second touching time for which the second touching operation is detected is equal to the predetermined time or shorter (Step S30). When it is determined that the second touching time is equal to the predetermined time or shorter (for example, 0.5 seconds or shorter) (Step S30: YES), the input determination unit 165 performs a click control operation for determining the selection of the overlapped icon IC0 (Step S32). When the click control operation is performed, a program relating to the overlapped icon IC0 is executed, and then the processes subsequent to Step S24 are performed. The second touching operation corresponds to a second operation in the aspect.

Figure 18:
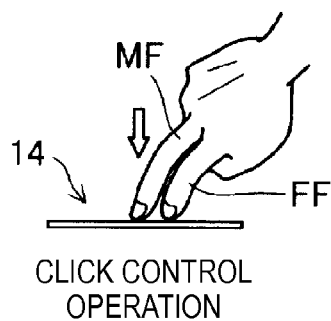
FIG. 18 is an explanatory diagram showing a touching state of a touching operation of a click control operation and the visual field of a user.
Figure 18:
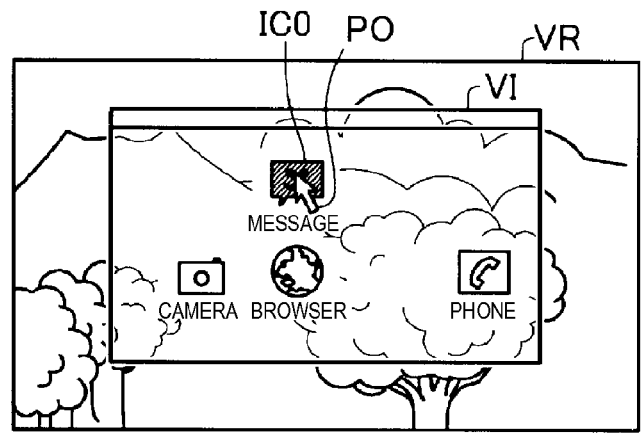

FIG. 18 is an explanatory diagram showing the touching state of the touching operation of the click control operation and the visual field VR of a user. FIG. 18 shows the second touching operation and the visual field VR of a user when the click control operation is performed. As shown in FIG. 18, the track pad 14 detects the second touching operation of a user, in addition to the first touching operation. In the embodiment, a right middle finger MF of a user touches the track pad 14 as the second touching operation. The time for which the touching of the middle finger MF as the second touching operation is detected is 0.5 seconds which is equal to the predetermined time or shorter. When the click control operation is performed, the OS 150 executes the program of the "message" which is the overlapped icon IC0.

In the process in Step S30 of FIG. 4, when it is determined that the second touching time is not equal to or shorter than the predetermined time (Step S30: NO), the track pad 14 determines whether or not the first touching position and the touching position of the track pad 14 of the second touching operation (hereinafter, also referred to as a "second touching position") simultaneously move in parallel (Step S32 of FIG. 5). Hereinafter, the first touching position and the second touching position are collectively referred to as two point touching positions. When it is determined that the two point touching positions simultaneously move in parallel (Step S32: YES), the input determination unit 165 performs a two-point drag control operation for moving the display position of the overlapped icon IC0 (Step S34). The "simultaneous" in the specification is not only limited to the temporally same moment, but also means the time zone with a constant width. The touching operations are performed by a user, and even when the start time of the change of the first touching position and the change of the second touching position is deviated by 0.1 seconds, the changes are treated as simultaneous changes in the specification. At the same time, the temporal deviation can be arbitrarily set. When noting the term "parallel" in the specification, the change of the first touching position and the change of the second touching position are not necessarily in the same trajectory, and may be slightly different from each other. For example, regarding the linear change of the first touching position and the linear change of the second touching position in the predetermined time period, the case in which an angle formed by the two linear lines is equal to or smaller than 5 degrees is included in the parallel case of the specification.

Figure 7:
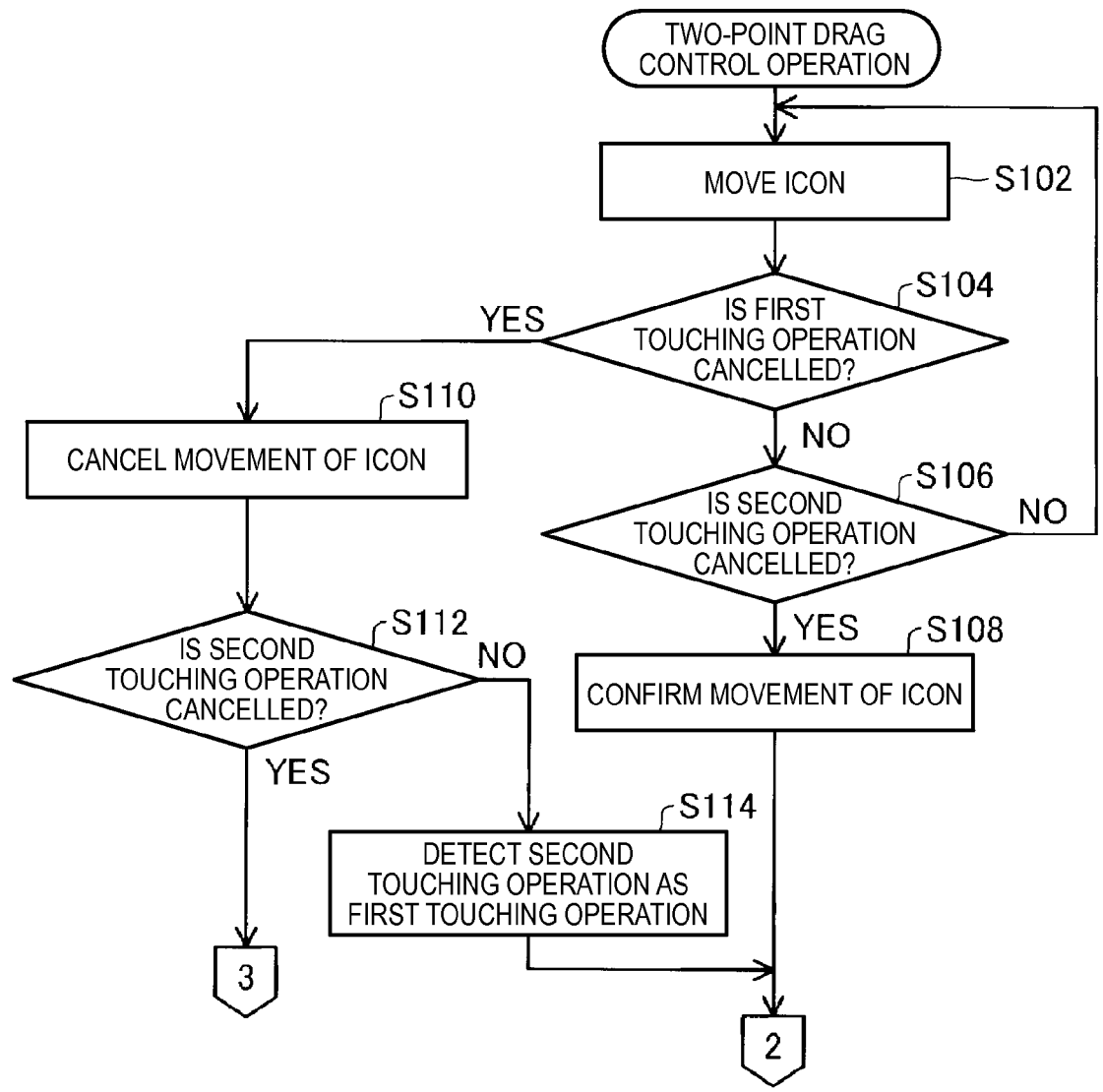
FIG. 7 is an explanatory diagram showing a flow of an operation control process.
Figure 19:
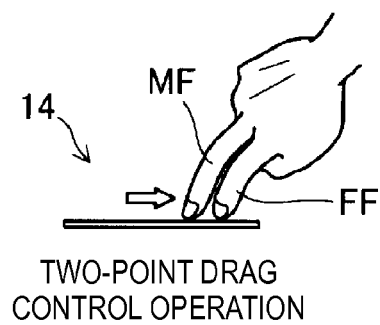
FIG. 19 is an explanatory diagram showing a touching state of a touching operation of a two-point drag control operation and the visual field of a user.
Figure 19:
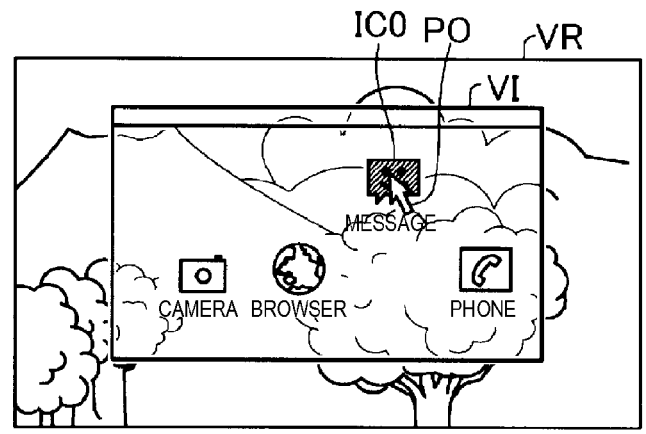

FIG. 7 shows a flow of the two-point drag control operation. In the two-point drag control operation, the input determination unit 165 first moves the display positions of the pointer PO and the overlapped icon IC0 according to the change of the two point touching positions (Step S102). At that time, the movement of the overlapped icon IC0 is in progress, and therefore the movement thereof is not confirmed. FIG. 19 is an explanatory diagram showing the touching state of the touching operation of the two-point drag control operation and the visual field VR of a user. The operation screen VI of FIG. 19 shows an image having the display positions of the pointer PO and the overlapped icon IC0 changed according to the change of the two point touching positions. As shown in FIG. 19, the display position of the overlapped icon IC0 moves and changes with the pointer PO, compared to before the two-point drag control operation (for example, FIG. 15).

When the pointer PO and the overlapped icon IC0 are moved (Step S102 of FIG. 7), the track pad 14 monitors canceling of the first touching operation in which the forefinger FF is separated (Step S104). When the first touching operation is not cancelled (Step S104: NO), the track pad 14 monitors canceling of the second touching operation in which the middle finger MF is separated (Step S106). When the second touching operation is not cancelled (Step S106: NO), the processes subsequent to Step S102 are performed. When the second touching operation is cancelled (Step S106: YES), the input determination unit 165 confirms the movement of the overlapped icon IC0 (Step S108). When the movement of the overlapped icon IC0 is confirmed, the first touching operation is only in the detected state, and accordingly the processes subsequent to Step S24 of FIG. 4 are performed.

In the process in Step S104 of FIG. 7, when the first touching operation is cancelled (Step S104: YES), the input determination unit 165 cancels the movement of the overlapped icon IC0 (Step S110). The cancelling of the movement of the overlapped icon IC0 indicates that the cancelling of the movement of the overlapped icon IC0 moved in the overlapped manner with the pointer PO, by the two-point drag control operation. In this case, the overlapped icon IC0 is displayed in the display position before the two-point drag control operation is performed. After that, the track pad 14 monitors the cancelling of the second touching operation (Step S112). When the second touching operation is cancelled (Step S112: YES), the state is in the non-touching state, and accordingly the track pad 14 monitors the detection of the predetermined operation of completing the operation control process (Step S35 of FIG. 4). When the predetermined operation is not detected (Step S35: NO), the processes subsequent to Step S35 are performed. When the predetermined operation is detected (Step S35: YES), the input determination unit 165 completes the operation control process.

In the process in Step S112 of FIG. 7, when the second touching operation is not cancelled (Step S112 of FIG. 7: NO), the track pad 14 newly detects the second touching operation of the middle finger MF detected on the track pad 14 as the first touching operation (Step S114). After that, the processes subsequent to Step S24 of FIG. 4 are performed.

Figure 5:
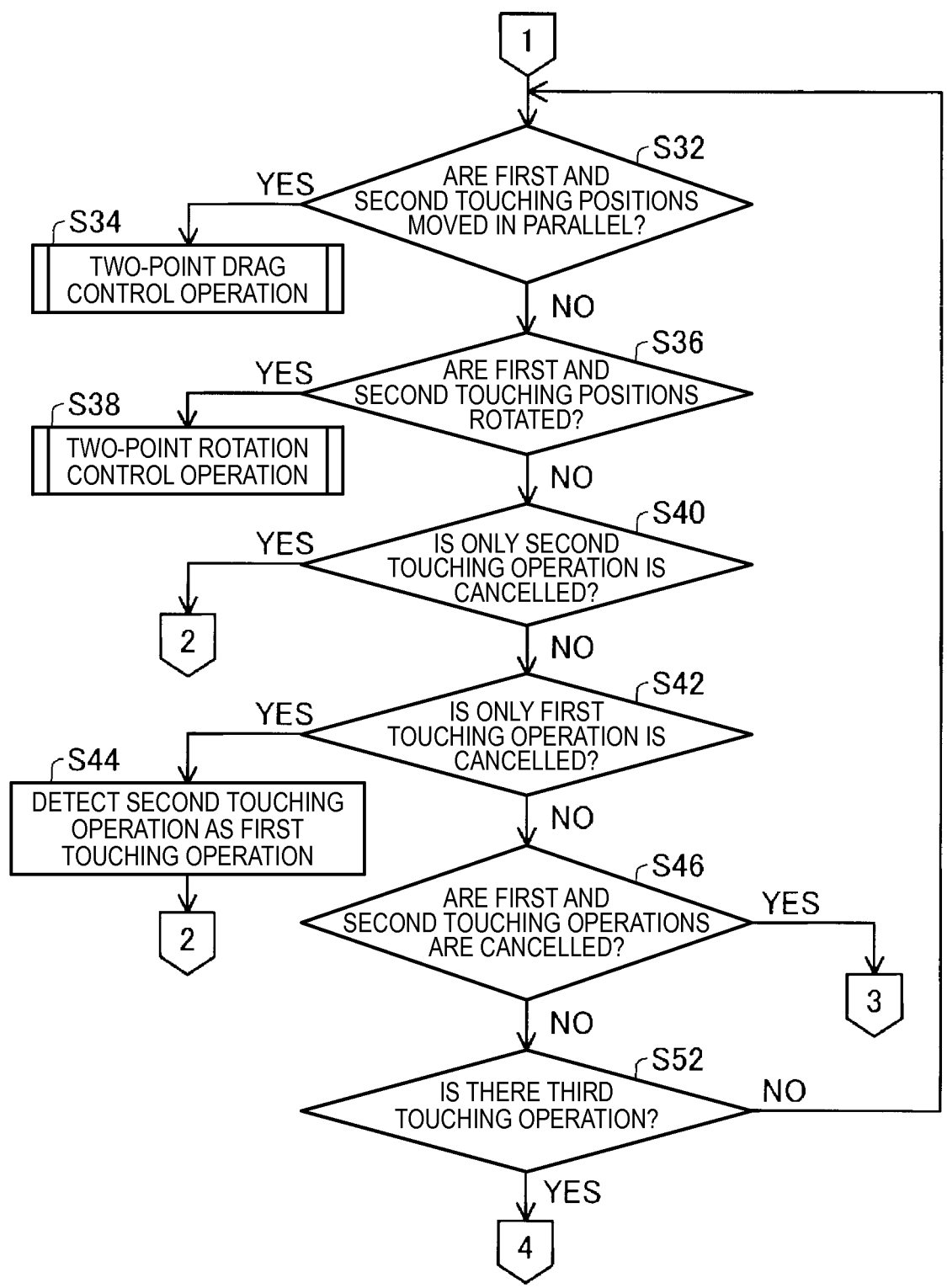
FIG. 5 is an explanatory diagram showing a flow of an operation control process.

In the process in Step S32 of FIG. 5, when it is determined that the two point touching positions are not moved in parallel (Step S32: NO), the input determination unit 165 determines whether or not the two point touching positions are rotated around a virtual rotation center axis which is vertical to the surface of the track pad 14 (Step S36). When it is determined that two point touching positions are rotated (Step S36 of FIG. 5: YES), the input determination unit 165 performs a two-point rotation control operation of rotating the overlapped icon IC0 using the center of the overlapped icon IC0 as an axis, according to the rotation of the two point touching positions (Step S38).

Figure 20:
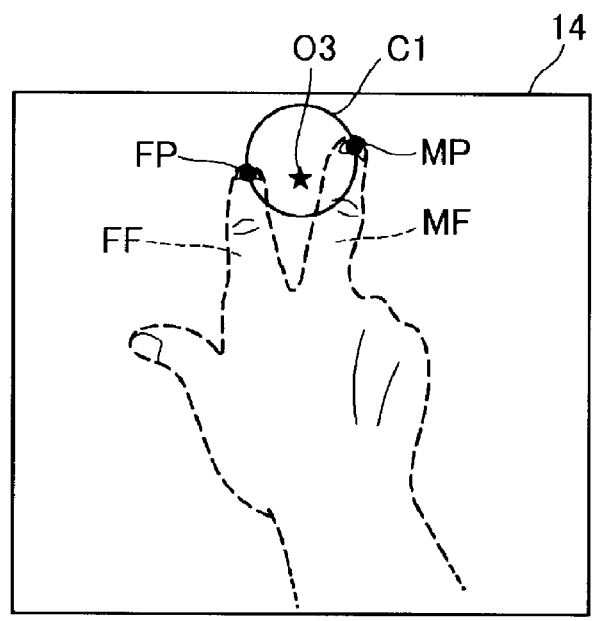
FIG. 20 is an explanatory diagram showing an example of a relationship between a rotation center of a two-point rotation control operation and two point touching positions.

FIG. 20 is an explanatory diagram showing an example of a relationship between a rotation center and the two point rotation positions of the two point touching positions. FIG. 20 shows a relationship of the track pad 14 and the fingers of a user, when the first touching operation and the second touching operation are detected. FIG. 20 shows a first touching position FP of the forefinger FF, a second touching position MP of the middle finger MF, a circular area C1 having a linear line between the first touching position FP and the second touching position MP as a diameter, and a rotation center axis O3 orthogonal to the surface of the track pad 14 passing the rotation center of the two-point rotation control operation. In the embodiment, when the rotation center axis O3 is included in the circular area C1, it is determined that the two point touching positions are rotated, and when the rotation center axis O3 is not included in the circular area C1, it is determined that the two point touching positions are not rotated.

Figure 8:
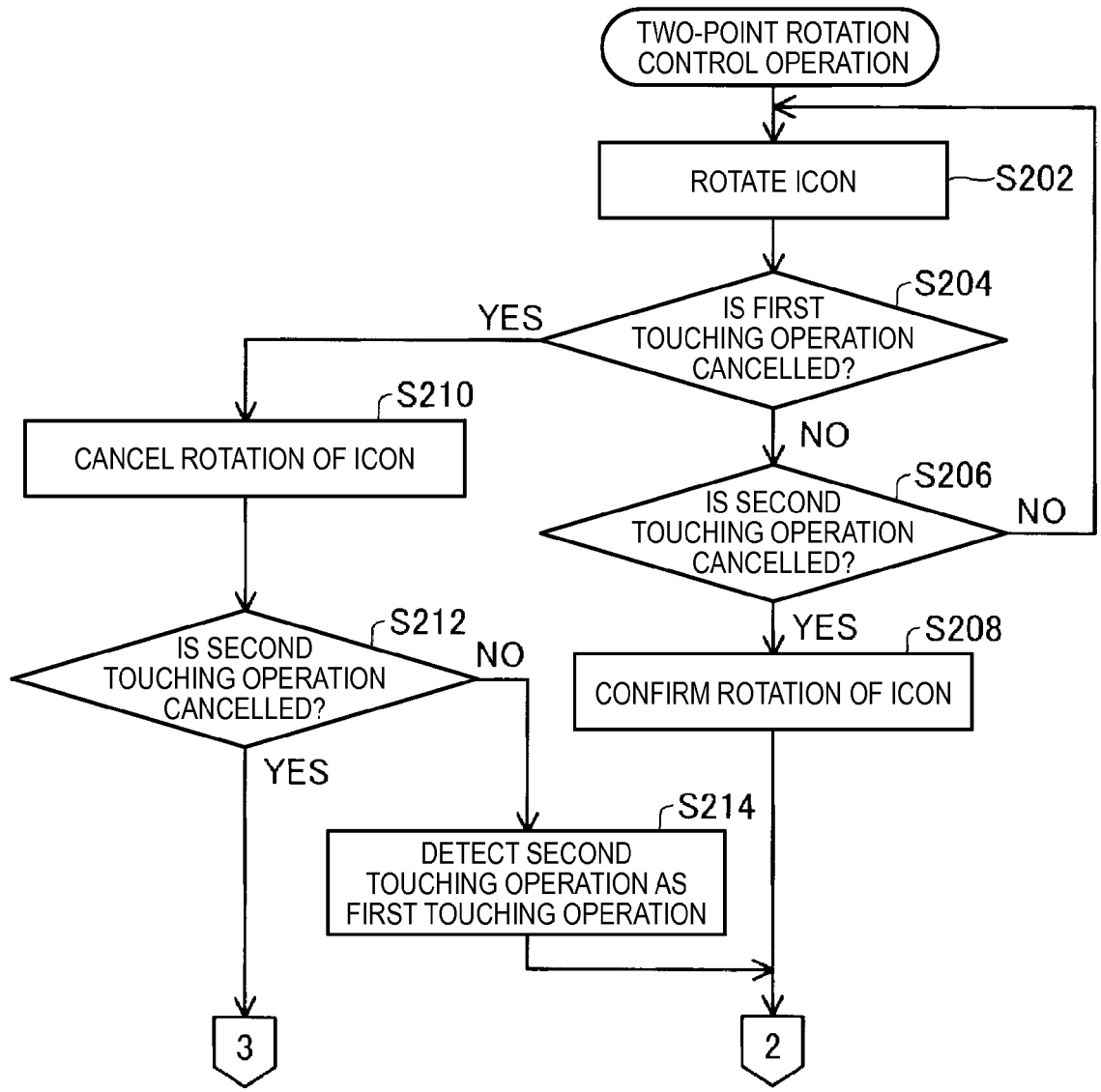
FIG. 8 is an explanatory diagram showing a flow of an operation control process.
Figure 21:
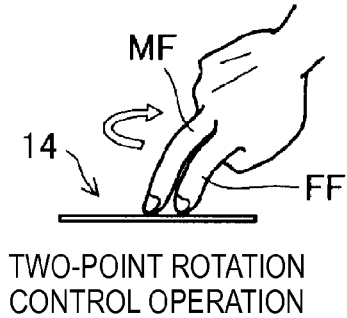
FIG. 21 is an explanatory diagram showing a touching state of a touching operation of a two-point rotation control operation and the visual field of a user.
Figure 21:
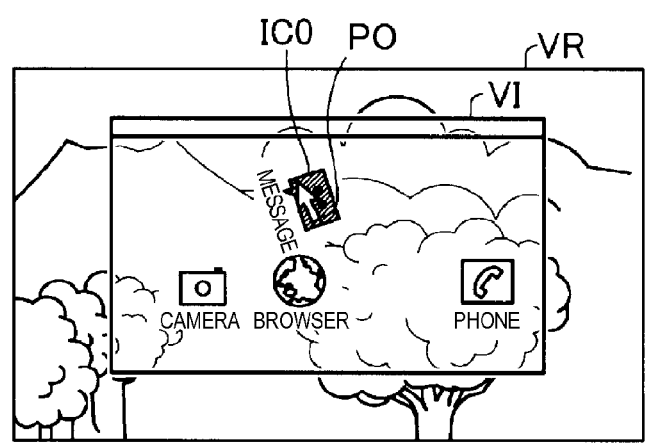

FIG. 8 shows a flow of the two-point rotation control operation. In the process of the two-point rotation control operation, the description regarding the process overlapped with the process of the two-point drag control operation shown in FIG. 7 is omitted, and Step S202, Step S208, and Step S210 which are different processes are described. In the two-point rotation control operation, the input determination unit 165 first rotates the overlapped icon IC0 according to the rotation of the two point touching positions (Step S202). FIG. 21 is an explanatory diagram showing the touching state of the touching operation of the two-point rotation control operation and the visual field VR of a user. The operation screen VI of FIG. 21 shows a display image when the overlapped icon IC0 is rotated, according to the rotation of the two point touching positions. In the embodiment, the overlapped icon IC0 is rotated by the two-point rotation control operation, but the pointer PO is not rotated. As shown in FIG. 21, the overlapped icon IC0 is rotated using the center of the overlapped icon IC0 on the surface parallel with the operation screen VI as an axis, compared to before the two-point rotation control operation (for example, FIG. 15).

In the process in Step S206, when the second touching operation is cancelled (Step S206: YES), the input determination unit 165 confirms the rotation of the overlapped icon IC0 (Step S208). In the process in Step S204, when the first touching operation is cancelled (Step S204: NO), the input determination unit 165 cancels the rotation of the overlapped icon IC0 (Step S210). When the rotation of the overlapped icon IC0 is cancelled, the state of the overlapped icon IC0 returns to the display before the two-point rotation control operation is performed.

In the process in Step S36 of FIG. 5, when it is determined that the two point touching positions are not rotated (Step S36: NO), the track pad 14 monitors the detection of the cancelling of only the second touching operation (Step S40). When only the second touching operation is cancelled (Step S40: YES), the processes subsequent to Step S24 of FIG. 4 are performed. When the cancelling of only the second touching operation is not detected (Step S40 of FIG. 5: NO), the track pad 14 monitors the detection of the cancelling of only the first touching operation (Step S42). When only the first touching operation is cancelled (Step S42: NO), the track pad 14 detects the second touching operation as the new first touching operation (Step S44), and processes subsequent to Step S24 of FIG. 4 are performed.

In the process in Step S42 of FIG. 5, when the cancelling of only the first touching operation is not detected (Step S42: NO), the track pad 14 monitors the detection of the cancelling of the first touching operation and the second touching operation (Step S46). When the first touching operation and the second touching operation are cancelled (Step S46: YES), the state is in the non-touching state, and accordingly the processes subsequent to Step S35 of FIG. 4 are performed. When both of the first touching operation and the second touching operation are not cancelled (Step S46 of FIG. 5: NO), the track pad 14 monitors the detection of a third touching operation (Step S52). When the third touching operation is not detected (Step S52: NO), the processes subsequent to Step S32 are performed. When the third touching operation is detected (Step S52: YES), the input determination unit 165 determines whether or not the third touching time for which the third touching operation is performed is equal to the predetermined time or shorter (Step S54 of FIG. 6). When it is determined that the third touching time is equal to the predetermined time or shorter (Step S54: YES), the input determination unit 165 performs a double click control operation of performing selection and determination of the overlapped icon IC0 (Step S56 of FIG. 6). In the embodiment, even when the pointer PO is overlapped with the icon IC, an icon with the color of the overlapped icon IC0 not changed, without the selection of the overlapped icon IC0 may exist. In this case, when the double click control operation is performed, the selection and determination of the overlapped icon IC0 of which the selection is not performed by only overlapping the pointer PO are executed. When the double click control operation is performed (Step S56), the processes subsequent to Step S24 of FIG. 4 are performed. The third touching operation corresponds to a second operation in the aspect.

In the process in Step S54, when it is determined that the third touching time is longer than the predetermined time (Step S54: NO), the track pad 14 determines whether or not the first touching position, the second touching position, and a touching position of the track pad 14 in the third touching operation (hereinafter, also referred to as a "third touching position") are moved in parallel (Step S58). Hereinafter, the first touching position, the second touching position, and the third touching position are collectively referred to as three point touching positions. When it is determined that the three point touching positions simultaneously move in parallel (Step S58: YES), the input determination unit 165 performs a three-point drag control operation for moving the display position of the overlapped icon IC0 (Step S60).

Figure 9:
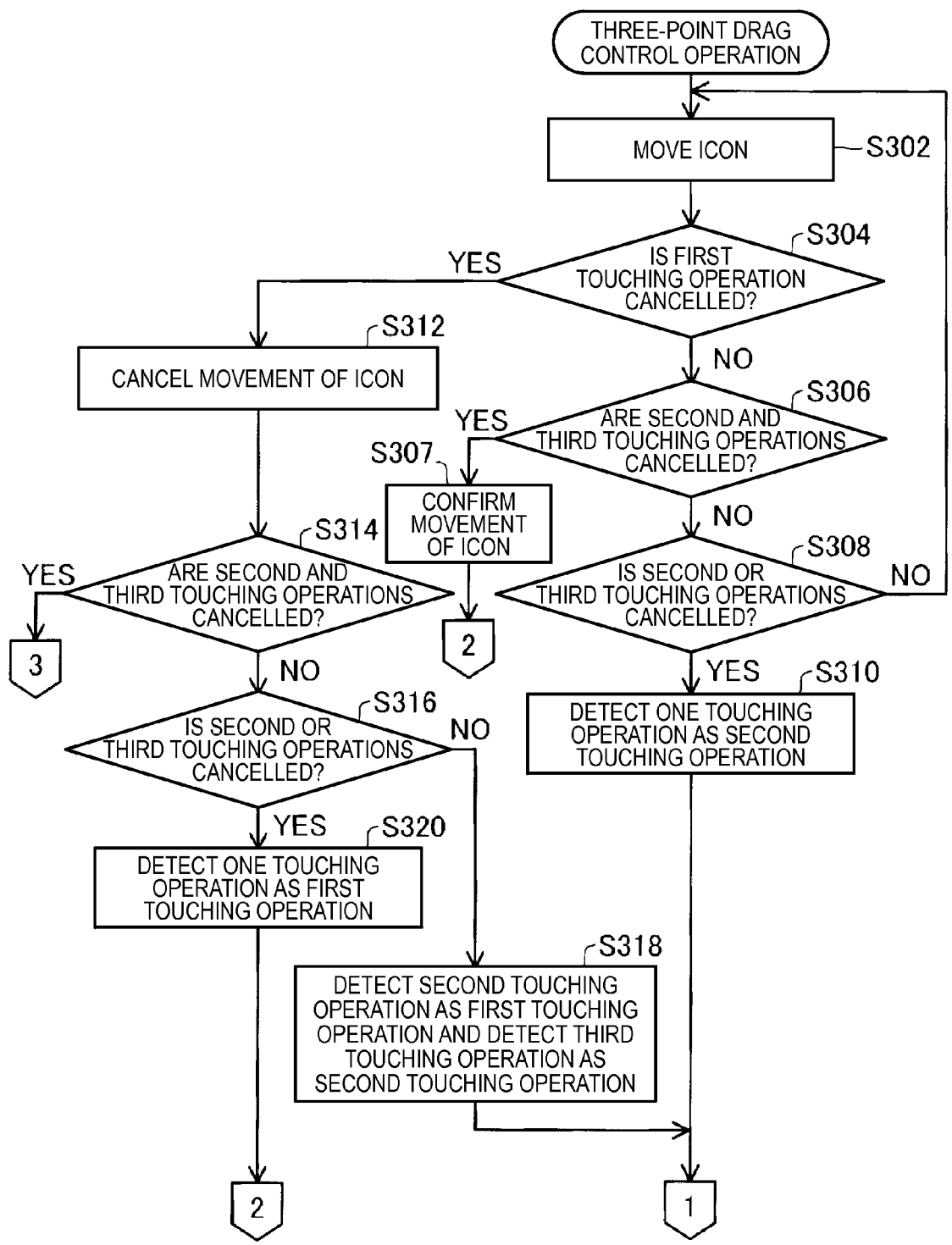
FIG. 9 is an explanatory diagram showing a flow of an operation control process.
Figure 22:
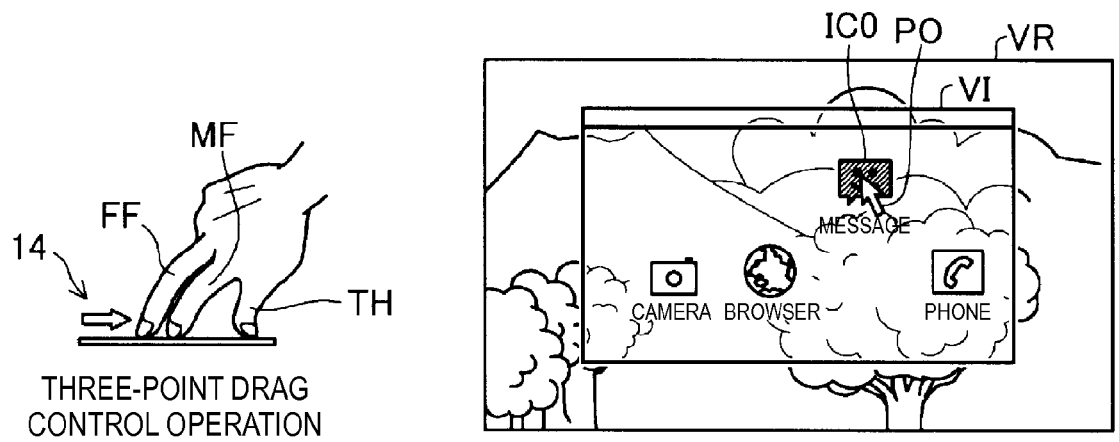
FIG. 22 is an explanatory diagram showing a touching state of a touching operation of a three-point drag control operation and the visual field of a user.

FIG. 9 shows a flow of the three-point drag control operation. In the three-point drag control operation, the input determination unit 165 first moves the display positions of the pointer PO and the overlapped icon IC0 according to the change of the three point touching positions (Step S302). FIG. 22 is an explanatory diagram showing the touching state of the touching operation of the three-point drag control operation and the visual field VR of a user. FIG. 22 shows a state where three fingers of the forefinger FF, the middle finger MF, and a thumb TH of a user touch the track pad 14. In the embodiment, the right thumb TH of a user touches the track pad 14 as the third touching operation. As shown in FIG. 22, the display position of the overlapped icon IC0 moves and changes with the pointer PO, compared to before the three-point drag control operation. When the pointer PO and the overlapped icon IC0 are moved (Step S302 of FIG. 9), the track pad 14 monitors canceling of the first touching operation (Step S304). When the first touching operation is not cancelled (Step S304: NO), the track pad 14 monitors canceling of the second touching operation and canceling of the third touching operation in which the thumb TH is separated (Step S306). When the second touching operation and the third touching operation are cancelled (Step S306: YES), the input determination unit 165 confirms the movement of the overlapped icon IC0 (Step S307). When the movement of the overlapped icon IC0 is confirmed, the first touching operation is only in the detected state, and accordingly the processes subsequent to Step S24 of FIG. 4 are performed. In the process in step 306 of FIG. 9, when the second touching operation and the third touching operation are not cancelled (Step S306: NO), the track pad 14 monitors cancelling of one of the second touching operation and the third touching operation (Step S308). When both of the second touching operation and the third touching operation are not cancelled (Step S308: NO), the first touching operation, the second touching operation, and the third touching operation are detected, and accordingly the processes subsequent to Step S304 are performed. In the process in Step S308, when one of the second touching operation and the third touching operation is cancelled (Step S308: YES), the track pad 14 detects one touching operation which is continuously detected, as the second touching operation (Step S310), and processes subsequent to Step S32 of FIG. 5 are performed.

In the process in Step S304 of FIG. 9, when the first touching operation is cancelled (Step S304: YES), the input determination unit 165 cancels the movement of the overlapped icon IC0 (Step S312). When the movement of the overlapped icon IC0 is cancelled, the overlapped icon IC0 is displayed in the display position before the three-point drag control operation is performed. After that, the track pad 14 monitors the cancelling of the second touching operation and the third touching operation (Step S314). When the second touching operation and the third touching operation are cancelled (Step S314: YES), the state is in the non-touching state, and accordingly the processes subsequent to Step S35 of FIG. 4 are performed. In the process in Step S314 of FIG. 9, when the second touching operation and the third touching operation are not cancelled (Step S314: NO), the track pad 14 monitors the cancelling of one of the second touching operation and the third touching operation (Step S318). When both of the second touching operation and the third touching operation are not cancelled (Step S316: NO), the track pad 14 detects the second touching operation as the new first touching operation, and detects the third touching operation as the new second touching operation (Step S318). After that, the processes subsequent to Step S32 of FIG. 5 are performed. In the process in Step S316 of FIG. 9, when one of the second touching operation and the third touching operation is cancelled (Step S316: YES), the track pad 14 detects one touching operation which is continuously detected, as the first touching operation (Step S320), and processes subsequent to step S24 of FIG. 4 are performed.

Figure 6:
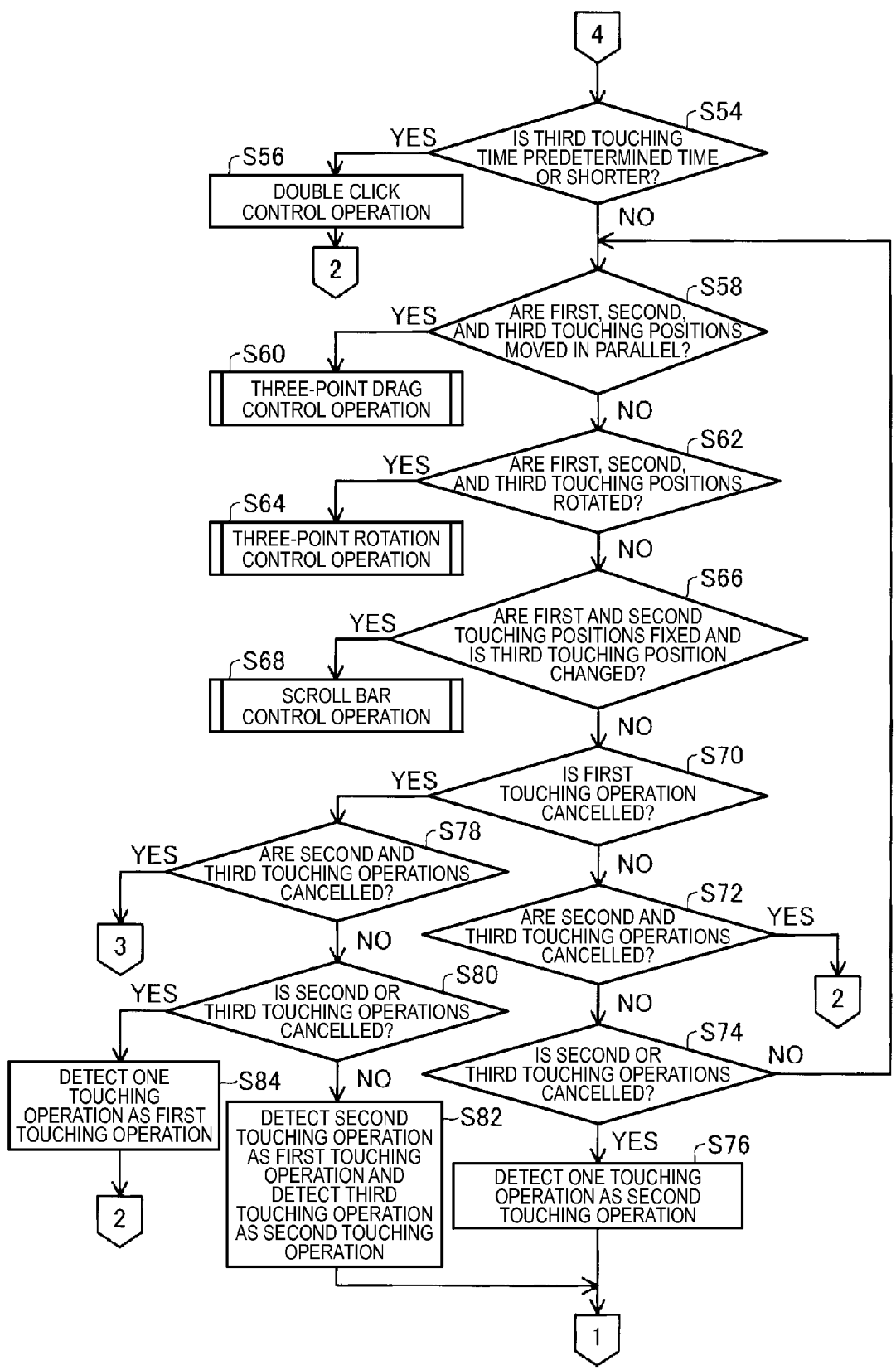
FIG. 6 is an explanatory diagram showing a flow of an operation control process.

In the process in Step S58 of FIG. 6, when it is determined that the three point touching positions are not moved in parallel (Step S58: NO), the input determination unit 165 determines whether or not the three point touching positions are rotated around a virtual rotation center axis which is vertical to the surface of the track pad 14 (Step S60). When it is determined that three point touching positions are rotated (Step S62: YES), the input determination unit 165 performs a three-point rotation control operation for rotating the overlapped icon IC0 displayed in the display area PN, using the center of the overlapped icon IC0 as an axis, according to the rotation of the three point touching positions (Step S64).

Figure 23:
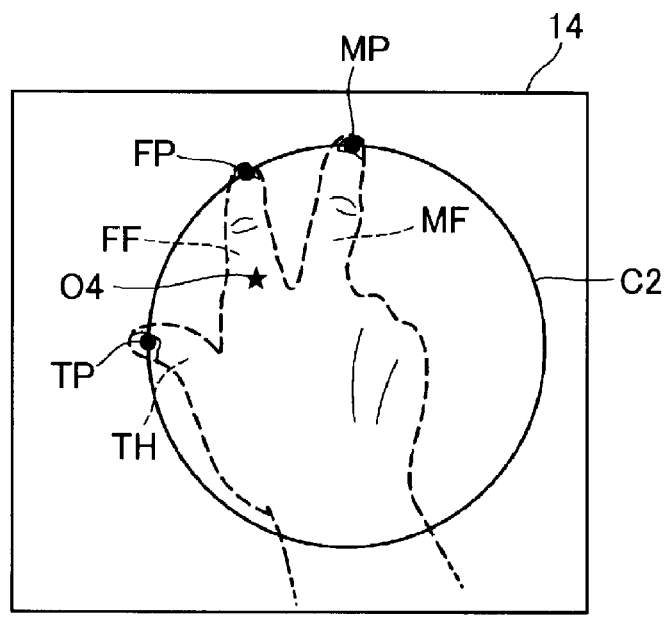
FIG. 23 is an explanatory diagram showing an example of a relationship between a rotation center of a three-point rotation control operation and three point touching positions.

FIG. 23 is an explanatory diagram showing an example of a relationship between the rotation center of the three-point rotation control operation and the three point touching positions. FIG. 23 shows a relationship between the track pad 14 and the fingers of a user, when the first touching operation, the second touching operation, and the third touching operation are detected. FIG. 23 shows the first touching position FP of the forefinger FF, the second touching position MP of the middle finger MF, a third touching position TP of the thumb TH, a circular area C2 passing the first touching position FP, the second touching position MP, and the third touching position TP, and a rotation center axis O4 orthogonal to the surface of the track pad 14 and passing the rotation center of the three-point rotation control operation. In the embodiment, when the rotation center axis O4 is included in the circular area C2, it is determined that the three point touching positions are rotated, and when the rotation center axis O4 is not included in the circular area C2, it is determined that the three point touching positions are not rotated.

Figure 10:
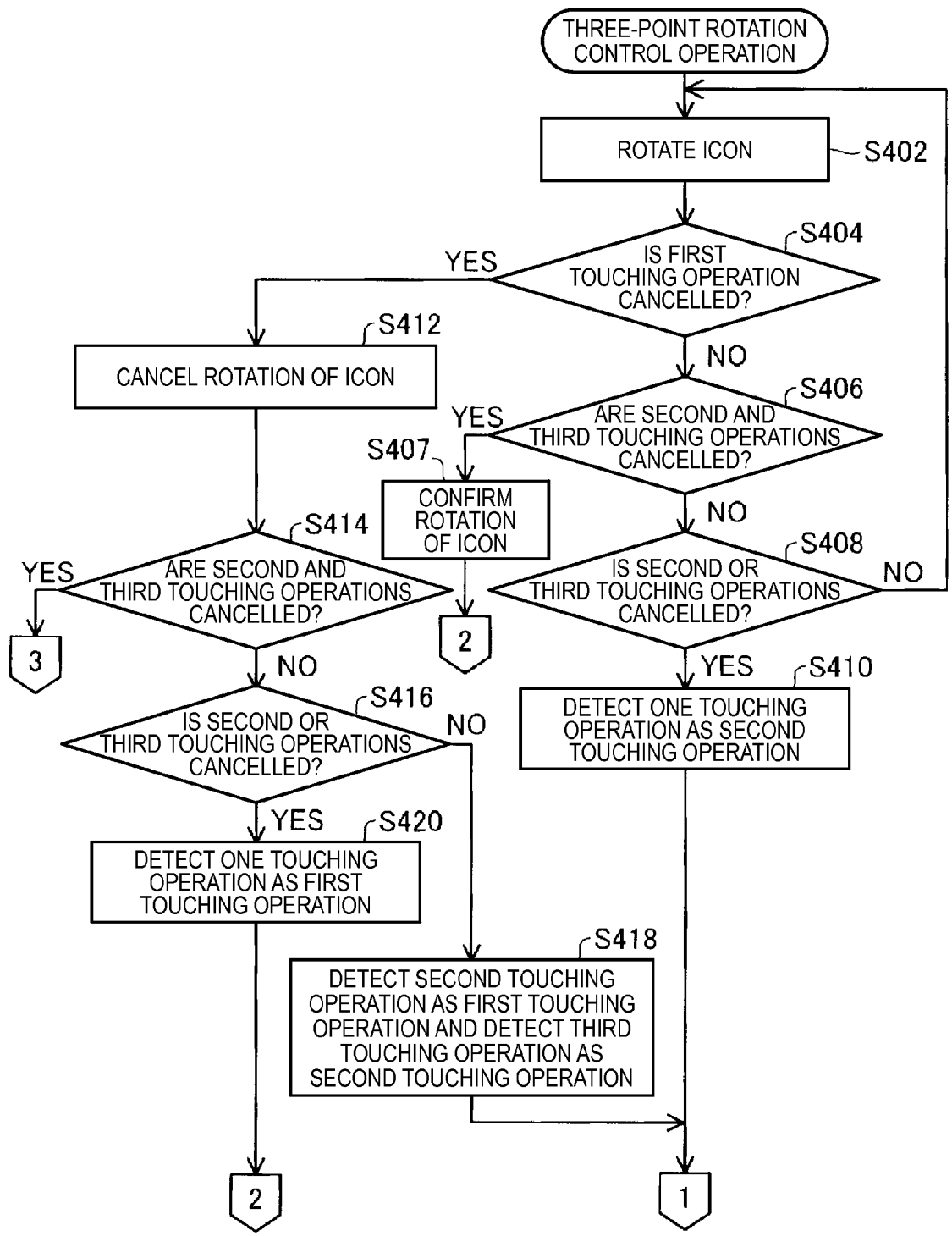
FIG. 10 is an explanatory diagram showing a flow of an operation control process.

FIG. 10 shows a flow of the three-point rotation control operation. In the process of the three-point rotation control operation, the description regarding the process overlapped with the process of the three-point drag control operation shown in FIG. 9 is omitted, and Step S402, Step S407, and Step S412 which are different processes are described. In the three-point rotation control operation, the input determination unit 165 first rotates the overlapped icon IC0 according to the rotation of the three point touching positions (Step S402). In the process in Step S406, when the second touching operation and the third touching operation are cancelled (Step S406: YES), the input determination unit 165 confirms the rotation of the overlapped icon IC0 (Step S407). In the process in Step S404, when the first touching operation is cancelled (Step S404: NO), the input determination unit 165 cancels the rotation of the overlapped icon IC0 (Step S412). When the rotation of the overlapped icon IC0 is cancelled, the state of the overlapped icon IC0 returns to the display before the three-point rotation control operation is performed.

In the process in Step S62 of FIG. 6, when it is determined that the three point touching positions are not rotated (Step S62: NO), the track pad 14 determines whether or not the third touching position is changed in a state where the first touching position and the second touching position are fixed (hereinafter, also referred to as to "perform the third position change") (Step S66). When it is determined that the third position change is performed (Step S66: YES) and an area of a part of a specific image is displayed in the display area PN, the input determination unit 165 performs a scroll bar control operation for changing an area of a part of the displayed specific image (Step S68).

Figure 11:
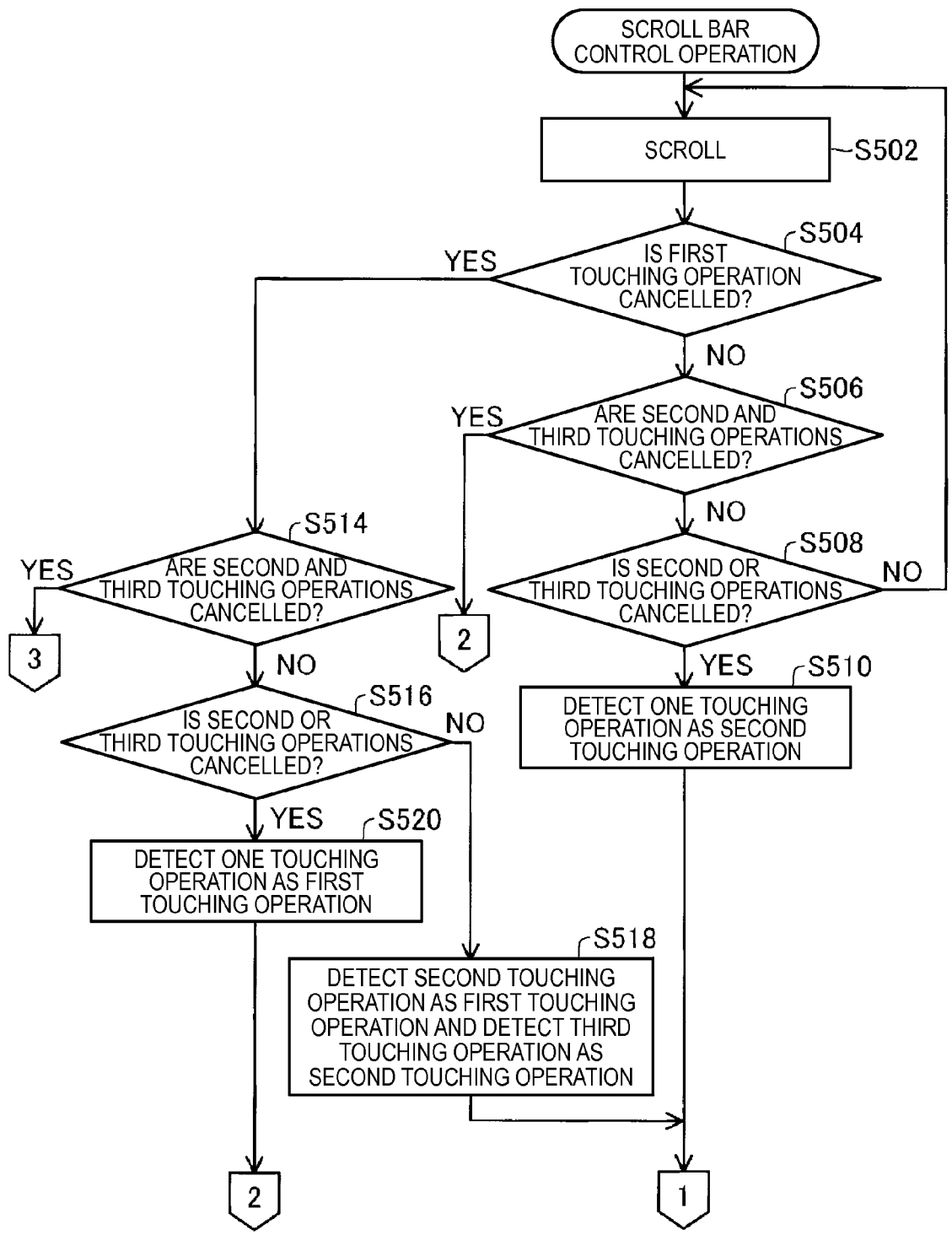
FIG. 11 is an explanatory diagram showing a flow of an operation control process.

FIG. 11 shows a flow of the scroll bar control operation. In the process of the scroll bar control operation, with respect to the process of the three-point drag control operation shown in FIG. 9, the process in Step S502 and the processes in Step S307 and Step S312 of the three point drag control operation are different from each other. Accordingly, in the scroll bar control operation, only the process in Step S502 (FIG. 11) is described. In the scroll bar control operation, in the specific image, the entirety of which is not displayed in the display area PN and only a part of which is displayed, the scrolling for changing an area of a part of the displayed specific image is performed (Step S502).

Figure 24:
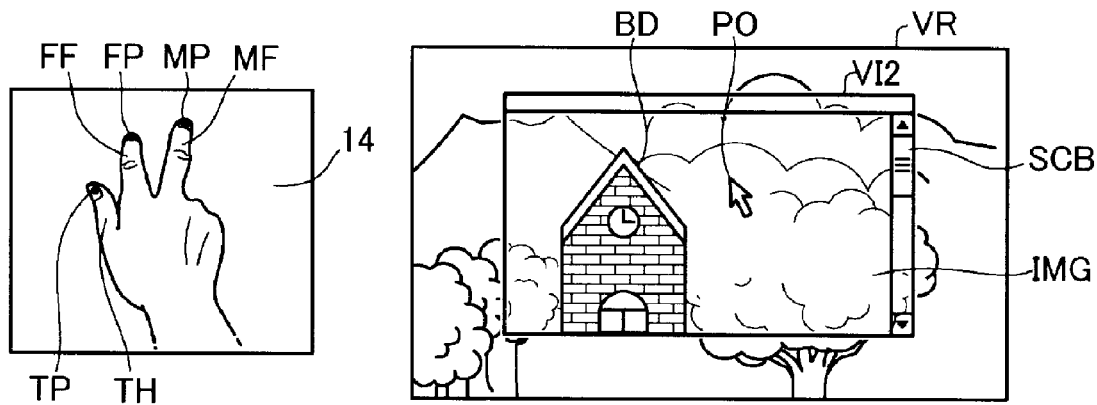
FIG. 24 is an explanatory diagram showing a touching state of a touching operation of a scroll bar control operation and the visual field of a user.
Figure 25:
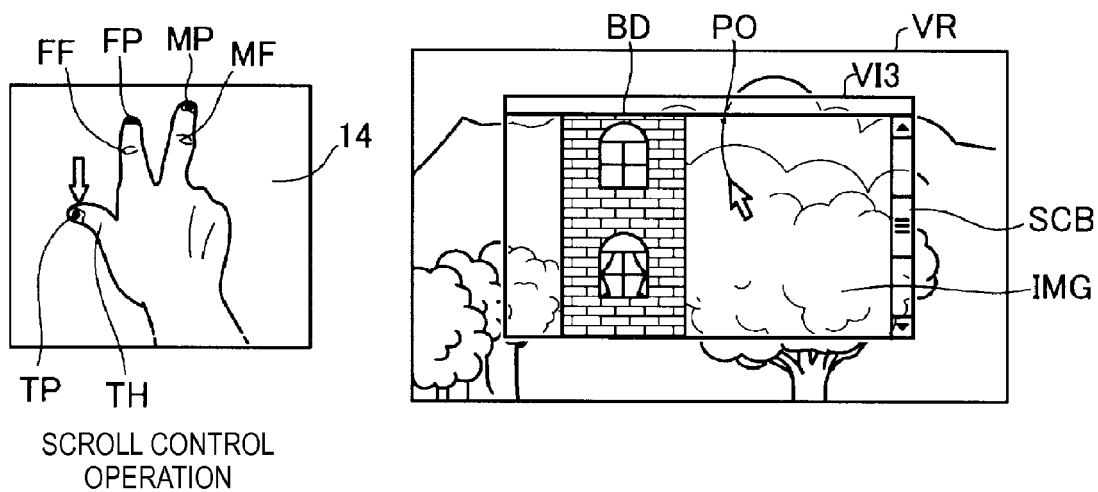
FIG. 25 is an explanatory diagram showing a touching state of a touching operation of a scroll bar control operation and the visual field of a user.

FIGS. 24 and 25 are explanatory diagrams showing the touching state of the touching operation of the scroll bar control operation and the visual field VR of a user. FIG. 24 shows the touching state and the visual field VR before the scrolling is performed, and FIG. 25 shows the touching state and the visual field VR after the scrolling is performed. As shown in FIG. 24, the forefinger FF, the middle finger MF, and the thumb TH of a user touch the track pad 14, and this is detected as the touching operation. When the third touching position TP is changed in the state where the first touching position FP and the second touching position MP are fixed, the scrolling is performed. As shown in the visual field VR of FIG. 24, a user visually recognizes an operation screen VI2. The operation screen VI2 includes a part of a specific image IMG having an area to be displayed which is larger than the operation screen VI2, and a scroll bar image SCB which changes according to the change of the third touching position TP. An image of a building BD is included in the specific image IMG. FIG. 25 shows the touching state of the track pad 14 after the third touching position TP is changed in a state where the first touching position FP and the second touching position MP are fixed, from the touching state shown in FIG. 24, and the visual field VR of a user. As shown in FIG. 25, since the scrolling is performed, a user visually realizes the operation screen VI3 which is different from the operation screen VI2 shown in FIG. 24. When the third touching position TP changes downward by scrolling, the display position of the scroll bar image SCB moves downward in the display area PN, and the area lower than the area of a part of the specific image IMG shown in FIG. 24 is displayed on the operation screen VI3. Accordingly, an image of lower floors of the building BD displayed on the operation screen VI3 is displayed in FIG. 25 rather than FIG. 24. In the scroll bar control operation of the embodiment, the position of the pointer PO is fixed. The click control operation, the two-point drag control operation, the two-point rotation control operation, the three-point drag control operation, the three-point rotation control operation, and the scroll bar control operation correspond to a second control operation in the aspect.

In the process in Step S66 of FIG. 6, when it is determined that the third position change is not performed (Step S66: NO), the track pad 14 monitors the canceling of the first touching operation (Step S70). When the first touching operation is not cancelled (Step S70: NO), the track pad 14 monitors the canceling of the second touching operation and the canceling of the third touching operation (Step S72). When the second touching operation and the third touching operation are cancelled (Step S72: YES), the first touching operation is only in the detected state, and accordingly the processes subsequent to Step S24 of FIG. 4 are performed. In the process in Step S72 of FIG. 6, when the second touching operation and the third touching operation are not cancelled (Step S72: NO), the track pad 14 monitors cancelling of one of the second touching operation and the third touching operation (Step S74). When both of the second touching operation and the third touching operation are not cancelled (Step S74: NO), the first touching operation, the second touching operation, and the third touching operation are detected, and accordingly the processes subsequent to Step S58 are performed. In the process in Step S74, when one of the second touching operation and the third touching operation is cancelled (Step S74: YES), the track pad 14 detects one touching operation which is continuously detected, as the second touching operation (Step S76), and processes subsequent to Step S32 of FIG. 5 are performed.

In the process in Step S70 of FIG. 6, when the first touching operation is cancelled (Step S70: YES), the track pad 14 monitors the cancelling of the second touching operation and the third touching operation (Step S78). When the second touching operation and the third touching operation are cancelled (Step S78: YES), the state is in the non-touching state, and accordingly the processes subsequent to Step S35 of FIG. 4 are performed. In the process in Step S78 of FIG. 6, when the second touching operation and the third touching operation are not cancelled (Step S78: NO), the track pad 14 monitors the cancelling of one of the second touching operation and the third touching operation (Step S80). When both of the second touching operation and the third touching operation are not cancelled (Step S80: NO), the track pad 14 detects the second touching operation as the new first touching operation, and detects the third touching operation as the new second touching operation (Step S82). After that, the processes subsequent to Step S32 of FIG. 5 are performed. In the process in Step S80 of FIG. 6, when one of the second touching operation and the third touching operation is cancelled (Step S80: YES), the track pad 14 detects one touching operation which is continuously detected, as the first touching operation (Step S84), and processes subsequent to step 24 of FIG. 4 are performed.

As described above, in the head mounted display 100 of the embodiment, the track pad 14 included in the operation unit 135 detects the touching operations of the fingers of a user and outputs a signal corresponding to the detected content. The input determination unit 165 determines the input based on the touching operation detected by the track pad 14 and the operation pressed through the menu key 17, and the image processing unit 160 sets the display position of the pointer PO displayed in the display area PN, based on the transmitted signal. When the first touching operation is detected, the input determination unit 165 displays the pointer PO in the display area PN, and changes the display position of the pointer PO by the change of the first touching position. After that, when it is determined that the touching time of the second touching operation is equal to the predetermined time or shorter, in a state where the first touching operation is detected, the input determination unit 165 performs the click control operation of determining the selection of the overlapped icon IC0. Accordingly, in the head mounted display 100 of the embodiment, since various operations are performed by detecting the touching operation at the arbitrary timing and in the arbitrary position of the track pad 14, user convenience and operability are improved, and a user can intuitively and simply operate the head mounted display 100. In addition, the track pad 14 as the operation surface is only preferable in order to receive the operation from a user, and therefore it is possible to miniaturize the operation unit 135, and it is possible to provide an input device having high portability.

In the head mounted display 100 of the embodiment, when the first touching operation is detected, the input determination unit 165 displays the pointer PO in the display area PN, and changes the display position of the pointer PO by the change of the first touching position. Accordingly, in the head mounted display 100 of the embodiment, since the operation such as the click control operation is performed in the state where the first touching operation is continued, the state is not in the non-touching state, the position of the pointer PO is fixed, and it is possible to suppress the occurrence of a malfunction. In the embodiment, the touching operation is employed as the operation received by the track pad 14, and accordingly the operation with fewer malfunctions is performed.

In the head mounted display 100 of the embodiment, when the pointer PO is overlapped with the icon IC (overlapped icon IC0) displayed in the display area PN, in a state where the first touching operation is detected, and the second touching operation is detected, the input determination unit 165 performs the click control operation of selecting the overlapped icon IC0. In the head mounted display 100 of the embodiment, when the pointer PO is overlapped with the icon IC (overlapped icon IC0) displayed in the display area PN and the two point touching positions are simultaneously parallel with each other, the input determination unit 165 performs the two-point drag control operation for moving the display position of the overlapped icon IC0 on the operation screen VI, according to the change of the two point touching positions. Accordingly, in the head mounted display 100 of the embodiment, even when the operation of pressing the buttons fixed to the specific position of the operation unit 135 is not performed, a user can select or move the overlapped icon IC0, and can perform the intuitive operation with a high degree of freedom.

In the head mounted display 100 of the embodiment, when the pointer PO is overlapped with the icon IC (overlapped icon IC0) displayed in the display area PN in the state where the first touching state is detected, the input determination unit 165 performs two-point rotation control operation for rotating the overlapped icon IC0, according to the rotation of the two point touching positions around the rotation center axis O3. When the rotation center axis O3 is included in the circular area C1 having the linear line between the first touching position FP and the second touching position MP as a diameter, the input determination unit 165 performs two-point rotation control operation. Accordingly, in the head mounted display 100 of the embodiment, even when the operation of pressing the buttons fixed to the specific position of the operation unit 135 is not performed, a user can rotate the overlapped icon IC0, and can perform the intuitive operation with a high degree of freedom. When the rotation center axis O3 is included in the circular area C1, the overlapped icon IC0 is rotated, and accordingly it is possible to suppress malfunctions from occurring.

In the head mounted display 100 of the embodiment, the input determination unit 165 sets the relationship system between the touching position and the display position of the pointer PO, to the absolute coordinate system in which the track pad 14 as the operation surface and the display area PN correspond to each other one to one. Accordingly, in the head mounted display 100 of the embodiment, when performing the operation while visually recognizing the track pad 14, a user can visually recognize the display position of the pointer image when performing an operation while visually recognizing the track pad 14, and accordingly, it is possible to intuitively move the pointer PO in the display area PN, and user convenience is improved.

In the head mounted display 100 of the embodiment, the input determination unit 165 sets the relationship system between the touching position and the display position of the pointer PO, to the relative coordinate system. In the relative coordinate system, after the certain time has elapsed from the touching state to the non-touching state, the pointer image is not displayed. After that, when the state is changed from the non-touching state to the touching state again, the input determination unit 165 displays the pointer image again in the display position of the pointer PO in the previous touching state, regardless of the newly detected touching position in the touching operation. Accordingly, in the head mounted display 100 of the embodiment, even when the track pad 14 is not visually recognized, a user can intuitively move the pointer PO by visually recognizing the display area PN, and user convenience is improved.

In the head mounted display 100 of the embodiment, when the infrared light receiving unit 63 receives the infrared light emitted by the infrared light emitting unit 61, the input determination unit 165 determines that the control unit 10 is in a predetermined position with respect to the image display unit 20. When the infrared light receiving unit 63 does not receive the emitted infrared light, the input determination unit 165 determines that the control unit 10 is not in a predetermined position with respect to the image display unit 20. When the operation unit 135 receives the predetermined operation, or with the determination of the input determination unit 165 of whether or not the control unit 10 is in the predetermined position with respect to the image display unit 20, the input determination unit 165 performs setting by switching the absolute coordinate system and the relative coordinate system with each other. Accordingly, in the head mounted display 100 of the embodiment, since the absolute coordinate system and the relative coordinate system are switched with each other and set according to the intention of a user, user convenience and operability are further improved. It is determined whether or not the control unit 10 included in the operation unit 135 is visually recognized by a user, by determining the position relationship between the image display unit 20 and the control unit 10, and the absolute coordinate system and the relative coordinate system are automatically switched to each other according to the determined result, and therefore user convenience is further improved.

In the head mounted display 100 of the embodiment, the acceleration sensor 19 acquires the acceleration (for example, gravitational acceleration) acting on the control unit 10, and the direction correction unit 167 specifies the direction of the control unit 10 based on the signal showing the acceleration acting on the control unit 10, which is transmitted from the acceleration sensor 19, and determines the conversion angle based on the angle formed by the direction of the control unit 10 and the direction of gravity. The input determination unit 165 corrects the change of the detected first touching position based on the conversion angle determined by the direction correction unit 167, and changes the display position of the pointer PO based on the corrected result. Accordingly, in the head mounted display 100 of the embodiment, the input is performed with the direction of gravity as a reference regardless of the direction of the operation unit 135, and user operability is improved. In the embodiment, the acceleration sensor 19 acquires the acceleration on a regular basis, once every 0.5 seconds, but the frequency for obtaining the acceleration is not limited thereto and various modifications can be performed. For example, the acceleration may be acquired once every second.

B. Modification Example

The invention is not limited to the embodiment and can be executed in various embodiments within a range not departing from the gist thereof, and for example, the following modifications can also be performed.

B1. Modification Example 1

In the embodiment, the forefinger FF is detected as the first touching operation, the middle finger MF is detected as the second touching operation, the thumb TH is detected as the third touching operation, but the touching operation to be detected is not limited to the specific finger, and the touching operation other than by the finger may be performed. For example, the middle finger MF may be detected as the first touching operation, and the thumb TH may be detected as the second touching operation. In addition, the touching operation from a touch pen, not the finger of a user, may be detected by the track pad 14. The operation of the track pad 14 is not limited to the touching operation and may be a non-touching operation. For example, the non-touching operation may be detected by using a three-dimensional motion sensor as the operation surface.

In the embodiment, the predetermined time of the determination for performing the click control operation is set as 0.5 seconds, but may be a value other than 0.5 seconds. For example, 0.1 seconds or 1.0 second may be set. When the second touching operation is detected again 0.5 seconds after the state is changed from the touching state to the non-touching state, the double click control operation, not the click control operation, may be performed.

In the embodiment, when the state is changed from the touching state to the non-touching state, the pointer PO is continuously displayed for a certain time, but various modifications can be performed regarding the setting of the display of the pointer PO in the non-touching state. For example, the setting may be performed so as to not display the pointer PO at the same time when the state is changed from the touching state to the non-touching state, and to not display the pointer PO constantly in the non-touching state.

When the operation screen VI is displayed regardless of the touching state and the non-touching state, the pointer PO may be constantly displayed.

In the embodiment, in the two-point rotation control operation and the three-point rotation control operation (also collectively referred to as the "rotation control operations"), the pointer PO is not rotated, but various modifications can be performed regarding the rotation of the pointer PO in the rotation control operation. For example, the pointer PO may not be rotated when performing the two-point rotation control operation and the pointer PO may be rotated simultaneously with the overlapped icon IC0 when performing the three-point rotation control operation. In the three-point rotation control operation, only the pointer PO, not the overlapped icon IC0, may be rotated.

In the embodiment, the image of the pointer PO is not changed, however, it is not necessary to set the image of the pointer PO not to be changed, and various modifications can be performed regarding the image of the pointer PO. For example, the image of the pointer PO may be changed, depending on the content of the control operation performed by the second touching position MP or the third touching position TP.

In the embodiment, when the rotation center axis O3 is included in the circular area C1 having the linear line between the first touching position FP and the second touching position MP as a diameter, the two-point rotation control operation is performed, however, it is not necessary to include the rotation center axis O3 in the circular area C1 for performing the two-point rotation control operation. For example, the two-point rotation control operation may be performed even when the rotation center axis O3 is at the outer side with respect to the area of the circular area C1, or the two-point rotation control operation may be performed when the third touching position TP is set as a new rotation center axis. The three-point rotation control operation may be performed, when the rotation center axis O4 is not included in the circular area C2.

In the embodiment, the input determination unit 165 specifies the position relationship between the control unit 10 and the image display unit 20, depending on the infrared light receiving unit 63 which received or which did not receive the infrared light emitted by the infrared light emitting unit 61, but the specific method of the position relationship is not limited thereto, and various modifications can be performed. For example, a camera disposed in the image display unit 20, instead of the infrared light emitting unit 61 and the infrared light receiving unit 63, may image the visual line direction of a user to determine whether or not the control unit 10 is included in an image captured by the input determination unit 165. In the embodiment, determination of whether or not the control unit 10 is in the predetermined position with respect to the image display unit 20 is specified, however, it is not necessary to specify the position relationship between the control unit 10 and the image display unit 20, and the relationship system between the detected touching position and the display position of the pointer PO may be constantly fixed to the absolute coordinate system or the relative coordinate system, regardless of the position relationship.

In the embodiment, the change of the touching position and the change of the display position of the pointer PO correspond to each other by the conversion angle determined by the direction correction unit 167 based on the acceleration acting on the control unit 10 acquired by the acceleration sensor 19, however, it is not necessary that the change of the touching position and the change of the display position of the pointer PO based on the conversion angle correspond to each other. For example, the acceleration sensor 19 and the direction correction unit 167 may not be included in the head mounted display 100, and the correspondence of the change of the touching position and the change of the display position of the pointer PO may not be corrected by the conversion angle.

In the embodiment, the "message" is described as an example of the overlapped icon IC0 to be selected, but the icon IC to be selected and executed is not limited to the "message", and various modifications can be performed. For example, the "browser" of the icon IC displayed on the operation screen VI (FIG. 10) may be used, or the icon for executing the other program may be included in the operation screen VI. Even when the pointer PO is overlapped with the icon IC, the specific icon IC may be selected by a predetermined operation.

B2. Modification Example 2

In the embodiment, the scroll bar control operation is performed by the change of the three point touching positions, but the scroll bar control operation may be performed by the change of the two point touching positions, regardless of the detection of the third touching operation. For example, when the first touching position FP is fixed and the second touching position MP is changed in a state where the first touching operation and the second touching operation are detected and the third touching operation is not detected, the area of a part of the specific image IMG included in the operation screen VI2 (FIG. 24) may be changed, in a state where the display position of the pointer PO is fixed. In this modification example, when the scrolling of the specific image IMG is not performed, it is not necessary for a user to move the pointer PO so as to be overlapped with the scroll bar image SCB and select the scroll bar image SCB, and it is possible to simply perform the scrolling, and user convenience or operability is improved.

In the embodiment, various control operations are performed according to the change of the plurality of detected touching position in the touching operation, but two or more control operations may be combined with each other. For example, when the first touching position FP and the second touching position MP are simultaneously moved in parallel by the change of the three point touching positions, and the third touching position TP moves differently from the first touching position FP and the second touching position MP, the two-point drag control operation of the overlapped icon IC0 may be performed, and the scroll bar control operation may be performed.

In the embodiment, in the scroll bar control operation shown in FIG. 24 and FIG. 25, the area in which the specific image IMG is displayed is changed along the vertical direction of the display area PN by operating the scroll bar image SCB, but various modifications can be performed regarding the setting method of the area of the specific image IMG changed in the scroll control operation. For example, the scroll bar image SCB which changes along the vertical direction and the horizontal direction of the display area PN may be displayed, and the area of the specific image IMG may be changed along the vertical direction and the horizontal direction. When the scroll bar image SCB which changes along the vertical direction of the display area PN may be displayed, and the touching position of the touching operation corresponding to the controlling is obliquely changed, the scrolling only corresponding to the movement amount of the change of the touching position in the vertical direction may be performed.

In the embodiment, the head mounted display 100 is controlled according to three operations of the first touching operation, the second touching operation, and the third touching operation, but various modifications can be performed regarding the number of kinds of the detected touching operations. For example, the head mounted display 100 may be controlled only by the first touching operation and the second touching operation, and the third touching operation may not be detected. In addition, the head mounted display 100 may be controlled in combination with the fourth touching operation detected after the third touching operation.

In the embodiment, the plurality of control operations such as the click control operation or the rotation control operation are performed based on the plurality of touching operations, however, it is not necessary to perform the plurality of control operations. For example, the second touching operation may simply only correspond to the click control operation.

The operation determined by combining the first touching operation and the second touching operation may be changed by receiving the predetermined operation with the operation unit 135. For example, the click control operation may be performed by the first touching operation and the third touching operation. The control operation by the frequently used touching operation may be automatically set in a preferential manner, using artificial intelligence.

B3. Modification Example 3

In the embodiment, the operation unit 135 is formed in the control unit 10, however, various modifications can be performed regarding the embodiment of the operation unit 135. For example, a user interface which is the operation unit 135 may be used separately from the control unit 10. In this case, since the operation unit 135 is provided separately from the control unit 10 in which the power 130 or the like is formed, it is possible to perform miniaturization and user operability is improved.

For example, the image light generation unit may be have a configuration including an organic electro-luminescence (EL) display and an organic EL control unit. For example, as the image light generation unit, a liquid crystal on silicon (LCOS; LCoS is trademark) or a digital micro mirror device can be used, instead of the LCD. For example, the invention can also be applied to a laser retina projection type head mounted display 100.

For example, the head mounted display 100 may be a head mounted display having the embodiment in which the optical image display unit only covers a part of the eyes of a user, that is, the embodiment in which the optical image display unit does not entirely cover the eyes of a user. In addition, the head mounted display 100 may be a so-called single eye type head mounted display. The head mounted display 100 is set as a both eye type optical transmission type device, but the invention can also be applied to a head mounted display of another type such as a video transmission type device, for example.

In addition, as the earphone, an ear wearable type or a head band type device may be used, or the earphone may be omitted. For example, a head mounted display loaded on a vehicle such as a car or an airplane may be configured. A head mounted display embedded in a body protecting device such as a helmet may be configured.

B4. Modification Example 4

A configuration of the head mounted display 100 of the embodiment is one example, and various modifications can be performed thereon. For example, the direction key 16 provided in the control unit 10 may be omitted, or the other operation interface such as a stick for an operation may be provided in addition to the direction key 16 and the track pad 14. The control unit 10 may be configured to be connected to an input device such as a keyboard or a mouse so as to receive the input from the keyboard or the mouse.

In the embodiment, the image display unit 20 of the head mounted display 100 is used as the display device of the operation screen VI including the pointer PO or the icon IC, however, various modifications can be performed regarding the display device of the operation screen VI. For example, the display device may be a monitor connected to a personal computer (PC), or may be a projector which projects the operation screen VI on the screen.

As the image display unit, instead of the image display unit 20 mounted as the glasses, an image display unit of another type such as an image display unit mounted as a hat, for example, may be used. The earphones 32 and 34 can be suitably omitted. In the embodiment, the LCD and the light source are used as the configuration for generating the image light, but instead thereof, another display element such as an organic EL display may be used.

Figure 26A:
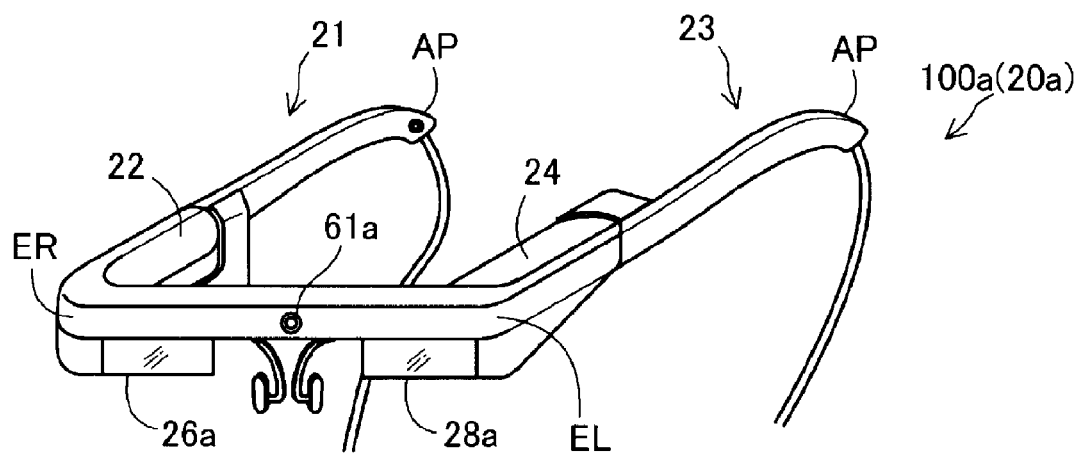
FIGS. 26A and 26B are explanatory diagrams showing appearance configurations of a head mounted display of Modification Examples.
Figure 26B:
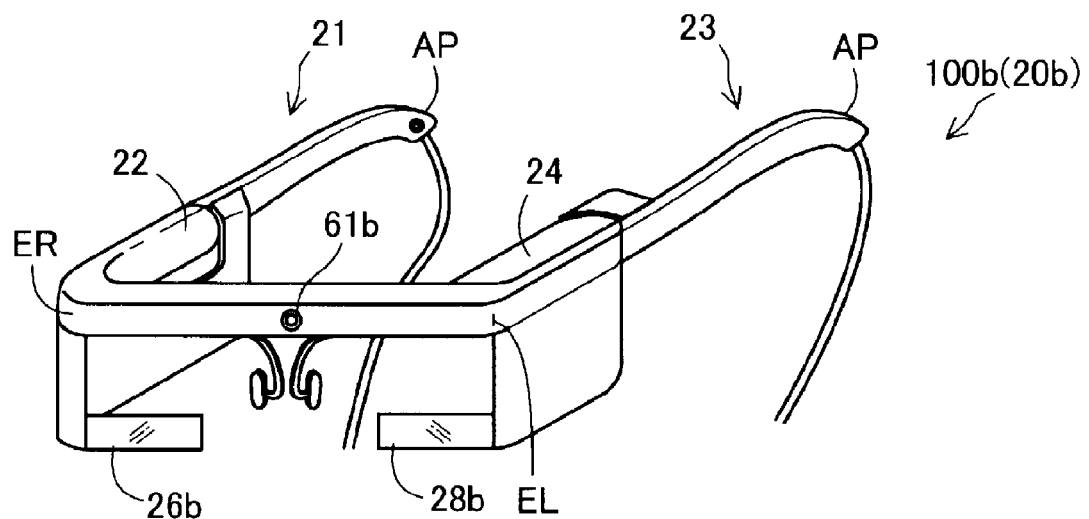

FIGS. 26A and 26B are explanatory diagrams showing appearance configurations of the head mounted display of the modification examples. In a case of an example of FIG. 26A, the differing points from the head mounted display 100 shown in FIG. 1 are that an image display unit 20a includes a right optical image display unit 26a instead of the right optical image display unit 26 and includes a left optical image display unit 28a instead of the left optical image display unit 28. The right optical image display unit 26a is formed to be smaller than the optical member of the embodiment described above, and is disposed at an obliquely upper portion of the right eye of a user when mounting a head mounted display 100a. In the same manner as described above, the left optical image display unit 28b is formed to be smaller than the optical member of the embodiment described above, and is disposed at an obliquely upper portion of the left eye of a user when mounting the head mounted display 100a. In a case of example of FIG. 26B, the differing points from the head mounted display 100 shown in FIG. 1 are that an image display unit 20b includes a right optical image display unit 26b instead of the right optical image display unit 26 and includes a left optical image display unit 28b instead of the left optical image display unit 28. The right optical image display unit 26b is formed to be smaller than the optical member of the embodiment described above, and is disposed at an obliquely lower portion of the right eye of a user when mounting a head mounted display. The left optical image display unit 28b is formed to be smaller than the optical member of the embodiment described above, and is disposed at an obliquely lower portion of the left eye of a user when mounting the head mounted display. As described above, the optical image display units are not limited as long as they are disposed near the eyes of a user. The size of the optical members configuring the optical image display units is also arbitrarily set, and it is possible to implement the head mounted display 100 having the embodiment in which the optical image display unit covers only a part of the eyes of a user, that is, the embodiment in which the optical image display unit does not entirely cover the eyes of a user.

In the embodiment, the head mounted display 100 may guide the image light showing the same images to the right and left eyes of a user to allow a user to visually recognize a two-dimensional image, or may guide the image light showing the different images to the right and left eyes of a user so as to allow a user to visually recognize a three-dimensional image.

In the embodiment, a part of the configuration implemented with the hardware may be replaced with the software, and conversely, a part of the configuration implemented with the software may be replaced with the hardware. For example, in the embodiment, the image processing unit 160 or the sound processing unit 170 is implemented by reading out and executing the computer programs with the CPU 140, however, the functional units may be implemented by a hardware circuit.

When some or all of the functions of the invention are implemented with the software, the software (computer programs) can be provided in a state of being stored in a computer-readable recording medium. In the invention, the "computer-readable recording medium" is not limited to a mobile recording medium such as a flexible disk or a CD-ROM, but also includes various internal recording devices in the computer such as a RAM or a ROM, or external recording devices fixed to the computer such as a hard disk.

In the embodiment, as shown in FIG. 1 and FIG. 2, the control unit 10 and the image display unit 20 are formed with separate configurations, however, the configurations of the control unit 10 and the image display unit 20 are not limited, and various modifications can be performed. For example, the entirety or a part of the configuration formed in the control unit 10 may be formed in the image display unit 20. The power 130 of the embodiment may be formed alone to be replaced, or may be formed in the image display unit 20 with the same configuration formed in the control unit 10. For example, the CPU 140 shown in FIG. 2 may be formed in both of the control unit 10 and the image display unit 20, or the functions performed by the CPU 140 formed in the control unit 10 and a CPU formed in the image display unit 20 may be configured separated.

The control unit 10 may be embedded in the PC and the image display unit 20 may be used instead of the monitor of the PC, or the control unit 10 and the image display unit 20 may be integrally provided to be attached to the clothing of a user as a wearable computer.

The invention is not limited to the embodiments and modification examples, and can be implemented with various configurations within a range not departing from the scope thereof. For example, the technical features in the embodiments and the modification examples corresponding to technical features in each embodiment disclosed in the summary of the invention can be suitably replaced or combined, in order to solve some or all of the problems described above or in order to implement some or all of the advantages described above. The technical features can be suitably removed, as long as the technical features are not described as compulsory in the specification.

The entire disclosure of Japanese Patent Application No. 2013-259059, filed Dec. 16, 2013 is expressly incorporated by reference herein.

What is claimed is:

1. An information processing apparatus comprising:
    an operation unit which includes an operation surface, and
        a position designation unit which detects at least one operation to the operation surface and outputs a position designation signal according to the detected position; and
    a control unit which performs a first control operation based on the position designation signal according to a first operation detected by the operation to the operation surface, continues the first operation, and performs a second control operation which is different from the first control operation with respect to the information processing apparatus, based on a new second operation to the operation surface, the second control operation being performed in response to both the first operation and the second operation simultaneously being executed on the operation surface.

2. The information processing apparatus according to claim 1, wherein
    the control unit sets a position of a pointer image to be displayed in an image area in which an image display device displays an image, as the first control operation.

3. The information processing apparatus according to claim 2, wherein,
    when a selectable object and the pointer image displayed in the image area are overlapped with each other in a state where the first operation is continued, and the second operation is detected, the control unit performs a click control operation of selecting the object overlapped with the pointer image, as the second control operation.

4. The information processing apparatus according to claim 2, wherein
    when a selectable object and the pointer image displayed in the image area are overlapped with each other, and a change of the detected position of the first operation and the detected position of the second operation which are simultaneously moved in parallel, is detected, the control unit performs a drag control operation for changing the position of the object overlapped with the pointer image based on the change of the detected position, as the second control operation.

5. The information processing apparatus according to claim 2, wherein
    when a selectable object and the pointer image displayed in the image area are overlapped with each other, and the change of the detected position of the first operation and the detected position of the second operation which are simultaneously rotated around a virtual specific axis which is orthogonal to the operation surface, is detected, the control unit performs a rotation control operation for rotating the object overlapped with the pointer image, as the second control operation.

6. The information processing apparatus according to claim 5, wherein,
    when the specific axis is included in a circle having a line between the detected position of the first operation and the detected position of the second operation as a diameter, the control unit performs the rotation control operation as the second control operation.

7. The information processing apparatus according to claim 2, wherein
    the control unit does not detect the change of the detected position of the first operation when an area of a part of a specific image is displayed in the image area, fixes the position of the pointer image as the second control operation when the change of the detected position of the second operation is detected, and performs a scroll bar control operation of changing the area of the specific image displayed in the image area, based on the change of the detected position of the second operation.

8. The information processing apparatus according to claim 2, wherein
the control unit allows the position of the pointer image in the image area to correspond to the detected position of the operation surface.

9. The information processing apparatus according to claim 2, wherein,
in a case of a second state in which the operation is detected again, after the state is moved from a first state in which the operation is detected to a state in which the operation is not detected, the control unit performs first setting for correlating the last position of the pointer image of the first state to the initial position of the pointer image in the second state, regardless of the detected position of the first operation.

10. The information processing apparatus according to claim 9, wherein
the control unit switches the first setting and second setting for correlating the position of the pointer image to the detected position of the operation surface, based on the operation.

11. The information processing apparatus according to claim 10, wherein
the image display device is a head mounted display which forms image light based on image data representing the image, allows the image light to be visually recognized by a user as a virtual image, and penetrate external scenery, in a state of being mounted on the head of a user,
the information processing apparatus further includes an operation surface determination unit which determines whether or not at least a part of the operation surface is included in the penetrated external scenery, and
the control unit switches to the first setting when it is determined that the operation surface is not included in the penetrated external scenery, and switches to the second setting when it is determined that at least a part of the operation surface is included in the penetrated external scenery.

12. The information processing apparatus according to claim 2, further comprising:
an acceleration detection unit which is disposed in the operation unit and detects acceleration of the operation unit,
wherein the control unit specifies the direction of the operation surface based on the detected acceleration of the operation unit, converts the change of the position designation signal to the position of the pointer image based on a first regulation, when the direction of the operation surface is a first direction, and converts the change of the position designation signal to the position of the pointer image based on a second regulation which is different from the first regulation, when the direction of the operation unit is a second direction which is different from the first direction.

13. The information processing apparatus according to claim 1, wherein
the operation to the operation surface is an operation of touching the operation surface.

14. A control method of an information processing apparatus including an operation unit which includes an operation surface, and a position designation unit which detects at least one operation to the operation surface and outputs a position designation signal according to the detected position, the method comprising:
performing a first control operation based on the position designation signal according to a first operation detected by the operation to the operation surface, continuing the first operation, and performing a second control operation which is different from the first control operation with respect to the information processing apparatus, based on a new second operation to the operation surface, the second control operation being performed in response to both the first operation and the second operation simultaneously being executed on the operation surface.

* * * * *